United States Patent
Puzio et al.

(10) Patent No.: US 7,588,398 B2
(45) Date of Patent: *Sep. 15, 2009

(54) TOOL CHUCK WITH POWER TAKE OFF AND DEAD SPINDLE FEATURES

(75) Inventors: Daniel Puzio, Baltimore, MD (US); Craig A. Schell, Street, MD (US); Robert S. Gehret, Hampstead, MD (US); Richard J. Heavel, Hanover, PA (US); Warren A. Ceroll, Owings Mills, MD (US); Stephen A. Debelius, New Freedom, PA (US)

(73) Assignee: Black & Decker Inc., Newark, DE (US)

( * ) Notice: Subject to any disclaimer, the term of this patent is extended or adjusted under 35 U.S.C. 154(b) by 394 days.

This patent is subject to a terminal disclaimer.

(21) Appl. No.: 11/400,378

(22) Filed: Apr. 10, 2006

(65) Prior Publication Data

US 2007/0132196 A1 Jun. 14, 2007

Related U.S. Application Data

(63) Continuation-in-part of application No. 11/227,200, filed on Sep. 16, 2005.

(60) Provisional application No. 60/672,503, filed on Apr. 19, 2005.

(51) Int. Cl.
*B23B 31/26* (2006.01)

(52) U.S. Cl. .......................... 408/124; 408/139; 279/60; 279/135; 279/902

(58) Field of Classification Search ............. 279/60–65, 279/134, 135, 902; 408/124
See application file for complete search history.

(56) References Cited

U.S. PATENT DOCUMENTS 913,059 A 2/1909 Savage (Continued)

FOREIGN PATENT DOCUMENTS

DE 1985830 5/1968

(Continued)

OTHER PUBLICATIONS

International Search Report issued Dec. 18, 2006 in corresponding European Patent Application No. EP 06 11 2710.

(Continued)

*Primary Examiner*—David P Bryant
*Assistant Examiner*—Eric A Gates
(74) *Attorney, Agent, or Firm*—Capitol City TechLaw

(57) ABSTRACT

A power driver may include a housing, a tool chuck and a power take off mechanism. The tool chuck may have an input shaft mounted for rotation on the housing. The input shaft may support chuck jaws. A chuck actuating shaft may be mounted for rotation on the input shaft. The power take off mechanism may be connected to the tool chuck. The power take off mechanism may be adjustable into a DRILL DRIVE MODE to rotationally drive the input shaft and the chuck actuating shaft together as a unit, and a CHUCK MODE to rotationally drive the chuck actuating shaft relative to the input shaft. The power take off mechanism may be internal of the housing. The power take off mechanism in the CHUCK MODE may rotationally fix the input shaft to the housing.

20 Claims, 16 Drawing Sheets

U.S. PATENT DOCUMENTS

| | | | |
|---|---|---|---|
| 1,705,275 A * | 3/1929 | Von Neudeck | 279/64 |
| 2,353,514 A | 7/1944 | Slater | |
| 2,684,856 A | 7/1954 | Stoner | |
| 2,716,555 A | 8/1955 | Walker | |
| 2,848,911 A | 8/1958 | Black | |
| 2,931,660 A | 4/1960 | Barwinkel | |
| 2,963,913 A * | 12/1960 | Wensloff | 74/15.6 |
| 3,021,723 A * | 2/1962 | Happe | 74/527 |
| 3,506,277 A | 4/1970 | Harms | |
| 3,545,766 A | 12/1970 | Osborn | |
| 3,776,647 A | 12/1973 | Hart | |
| 3,970,323 A | 7/1976 | Schnizler, Jr. | |
| 4,085,337 A * | 4/1978 | Moeller | 307/115 |
| 4,094,523 A | 6/1978 | Derbyshire | |
| 4,260,169 A | 4/1981 | Hall | |
| 4,277,074 A | 7/1981 | Kilberis | |
| 4,302,021 A | 11/1981 | Röhm | |
| 4,317,578 A | 3/1982 | Welch | |
| 4,323,324 A | 4/1982 | Eberhardt | |
| 4,358,230 A | 11/1982 | Rohlin | |
| 4,395,170 A | 7/1983 | Clarey | |
| 4,493,407 A | 1/1985 | Newton | |
| 4,498,682 A | 2/1985 | Glore | |
| 4,526,497 A | 7/1985 | Hatfield | |
| 4,527,809 A | 7/1985 | Umbert | |
| 4,536,113 A | 8/1985 | Hatfield | |
| 4,557,703 A | 12/1985 | Rivin | |
| 4,605,345 A | 8/1986 | Giughese | |
| 4,628,918 A | 12/1986 | Johnson, Jr. | |
| 4,655,464 A | 4/1987 | Manschitz et al. | |
| 4,664,394 A | 5/1987 | Theissig et al. | |
| 4,669,930 A | 6/1987 | Stenmark | |
| 4,669,932 A | 6/1987 | Hartley | |
| 4,682,918 A | 7/1987 | Palm | |
| 4,711,457 A | 12/1987 | Wezel | |
| 4,788,021 A | 11/1988 | Griffiths | |
| 4,802,798 A | 2/1989 | Adamson | |
| 4,824,298 A | 4/1989 | Lippacher et al. | |
| 4,840,387 A | 6/1989 | McCarthy | |
| 4,848,779 A | 7/1989 | Wheeler et al. | |
| 4,930,793 A | 6/1990 | Ando | |
| 4,951,955 A | 8/1990 | Sakamaki | |
| 4,955,623 A | 9/1990 | Röhm | |
| 4,958,840 A | 9/1990 | Palm | |
| 4,976,575 A | 12/1990 | Kappelhof et al. | |
| 4,998,589 A | 3/1991 | Wiesendanger | |
| 5,011,343 A | 4/1991 | Saban et al. | |
| 5,019,023 A | 5/1991 | Kurosawa | |
| 5,022,278 A | 6/1991 | DeCaussin | |
| 5,031,925 A | 7/1991 | Tatsu et al. | |
| 5,067,376 A | 11/1991 | Fossella | |
| 5,090,273 A | 2/1992 | Fossella | |
| 5,125,673 A | 6/1992 | Huff et al. | |
| 5,145,193 A | 9/1992 | Röhm | |
| 5,147,164 A | 9/1992 | Fraver | |
| 5,171,030 A | 12/1992 | Röhm | |
| 5,172,923 A | 12/1992 | Nakamura | |
| 5,174,588 A | 12/1992 | Reibetanz et al. | |
| 5,183,274 A | 2/1993 | Sakamaki | |
| 5,195,760 A * | 3/1993 | Wheeler et al. | 279/60 |
| 5,197,749 A | 3/1993 | Moore et al. | |
| 5,215,317 A | 6/1993 | Jordan et al. | |
| 5,232,230 A | 8/1993 | Lin | |
| 5,286,041 A | 2/1994 | Röhm | |
| 5,299,814 A | 4/1994 | Salpaka | |
| 5,322,303 A | 6/1994 | Nakamura | |
| 5,339,908 A | 8/1994 | Yokota et al. | |
| 5,340,248 A | 8/1994 | Enbergs | |
| 5,342,154 A | 8/1994 | Holzer | |
| 5,343,961 A | 9/1994 | Ichikawa | |
| 5,348,317 A | 9/1994 | Steadings et al. | |
| 5,348,318 A | 9/1994 | Steadings et al. | |
| 5,407,215 A | 4/1995 | Yang | |
| 5,419,663 A | 5/1995 | Psomas | |
| 5,431,420 A | 7/1995 | Huff et al. | |
| 5,435,578 A | 7/1995 | Röhm | |
| 5,448,931 A | 9/1995 | Fossella et al. | |
| 5,458,345 A | 10/1995 | Amyot | |
| 5,499,829 A | 3/1996 | Röhm | |
| 5,499,830 A | 3/1996 | Schnizler | |
| 5,531,549 A | 7/1996 | Fossella | |
| 5,553,873 A | 9/1996 | Salpaka et al. | |
| 5,573,358 A | 11/1996 | Gobbers et al. | |
| 5,624,125 A | 4/1997 | Röhm | |
| 5,685,549 A | 11/1997 | Yang | |
| 5,732,956 A | 3/1998 | Huff et al. | |
| 5,741,016 A | 4/1998 | Barton et al. | |
| 5,795,110 A | 8/1998 | Wirth et al. | |
| 5,820,134 A | 10/1998 | Subils Valls | |
| 5,908,076 A | 6/1999 | Marcengill et al. | |
| 5,918,685 A | 7/1999 | Ulbrich et al. | |
| 5,922,538 A | 7/1999 | Hazel et al. | |
| 5,951,026 A | 9/1999 | Harman, Jr. et al. | |
| 5,957,469 A | 9/1999 | Miles et al. | |
| 5,988,653 A | 11/1999 | Kuo | |
| 5,988,958 A | 11/1999 | Mack | |
| 5,992,859 A | 11/1999 | Lin | |
| 6,007,071 A | 12/1999 | Middleton | |
| 6,007,277 A | 12/1999 | Olson et al. | |
| 6,017,039 A | 1/2000 | Gaddis et al. | |
| 6,056,298 A | 5/2000 | Williams | |
| 6,073,939 A | 6/2000 | Steadings | |
| 6,079,716 A | 6/2000 | Harman, Jr. et al. | |
| 6,105,450 A | 8/2000 | Sasaki et al. | |
| 6,139,228 A | 10/2000 | Longo | |
| 6,173,972 B1 | 1/2001 | Temple-Wilson et al. | |
| 6,260,856 B1 | 7/2001 | Temple-Wilson | |
| 6,354,605 B1 | 3/2002 | Aultman | |
| 6,398,226 B1 | 6/2002 | Huggins et al. | |
| 6,431,289 B1 | 8/2002 | Potter | |
| 6,488,286 B2 | 12/2002 | Yaksich | |
| 6,488,287 B2 | 12/2002 | Gaddis et al. | |
| 6,506,002 B1 | 1/2003 | Cummins | |
| 6,517,295 B2 | 2/2003 | Lin | |
| 6,523,658 B2 | 2/2003 | Furuta et al. | |
| 6,648,563 B2 | 11/2003 | Rohm | |
| 6,729,812 B2 | 5/2004 | Yaksich et al. | |
| 6,733,393 B2 | 5/2004 | Rivin | |
| 6,736,410 B2 | 5/2004 | Barton et al. | |
| 6,805,206 B2 | 10/2004 | Hanke | |
| 6,832,764 B2 | 12/2004 | Steadings et al. | |
| 6,843,484 B2 * | 1/2005 | Schroeder | 279/60 |
| 7,021,400 B2 | 4/2006 | Oretti | |
| 7,073,606 B2 | 7/2006 | Mamber et al. | |
| 7,328,904 B2 * | 2/2008 | Schell et al. | 279/60 |
| 2001/0026051 A1 | 10/2001 | Gifford et al. | |
| 2003/0077137 A1 | 4/2003 | Rohm | |
| 2004/0146367 A1 | 7/2004 | Gerhardt et al. | |
| 2005/0013674 A1 | 1/2005 | Vidal | |
| 2006/0027978 A1 | 2/2006 | Young et al. | |
| 2006/0066063 A1 | 3/2006 | Nickels et al. | |
| 2006/0188350 A1 * | 8/2006 | Gehret et al. | 408/240 |

FOREIGN PATENT DOCUMENTS

| | | |
|---|---|---|
| DE | 2317779 | 10/1974 |
| DE | 7536582 | 5/1976 |
| DE | 7617128 | 12/1976 |
| DE | 2757140 | 6/1979 |
| DE | 8002633 | 7/1980 |
| DE | 3110458 | 10/1982 |
| DE | 3140776 | 4/1983 |
| DE | 8513848 | 8/1985 |
| DE | 9006555 | 9/1990 |

| | | |
|---|---|---|
| DE | 9405628 | 7/1994 |
| DE | 3527234 | 2/1997 |
| DE | 29820433 | 3/1999 |
| DE | 29913083 | 10/1999 |
| DE | 10125186 | 12/2002 |
| DE | 202004003323 | 8/2004 |
| DE | 10359420 | 7/2005 |
| EP | 0448801 | 10/1991 |
| EP | 0515371 | 12/1992 |
| EP | 0620069 | 10/1994 |
| EP | 0716896 | 1/1995 |
| EP | 0674961 | 10/1995 |
| EP | 1101553 | 5/2001 |
| FR | 1602481 | 1/1971 |
| WO | WO 00/35619 | 6/2000 |
| WO | WO 02/058893 A1 | 8/2002 |
| WO | WO 2005/025792 | 3/2005 |
| WO | WO 2006/034287 A2 | 3/2006 |

OTHER PUBLICATIONS

International Search Report and Written Opinion issued Feb. 26, 2007 in related PCT Application No. PCT/US05/33697.

International Search Report and Written Opinion issued Sep. 24, 2007 in related PCT Application No. PCT/US06/14421.

* cited by examiner

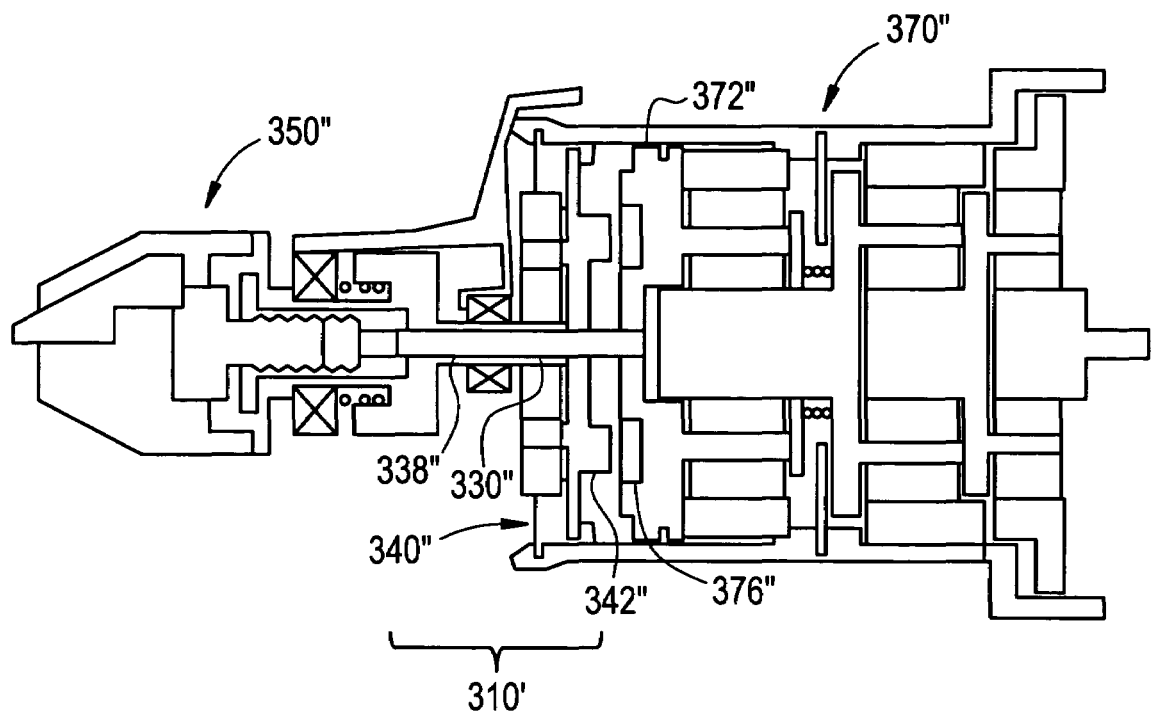
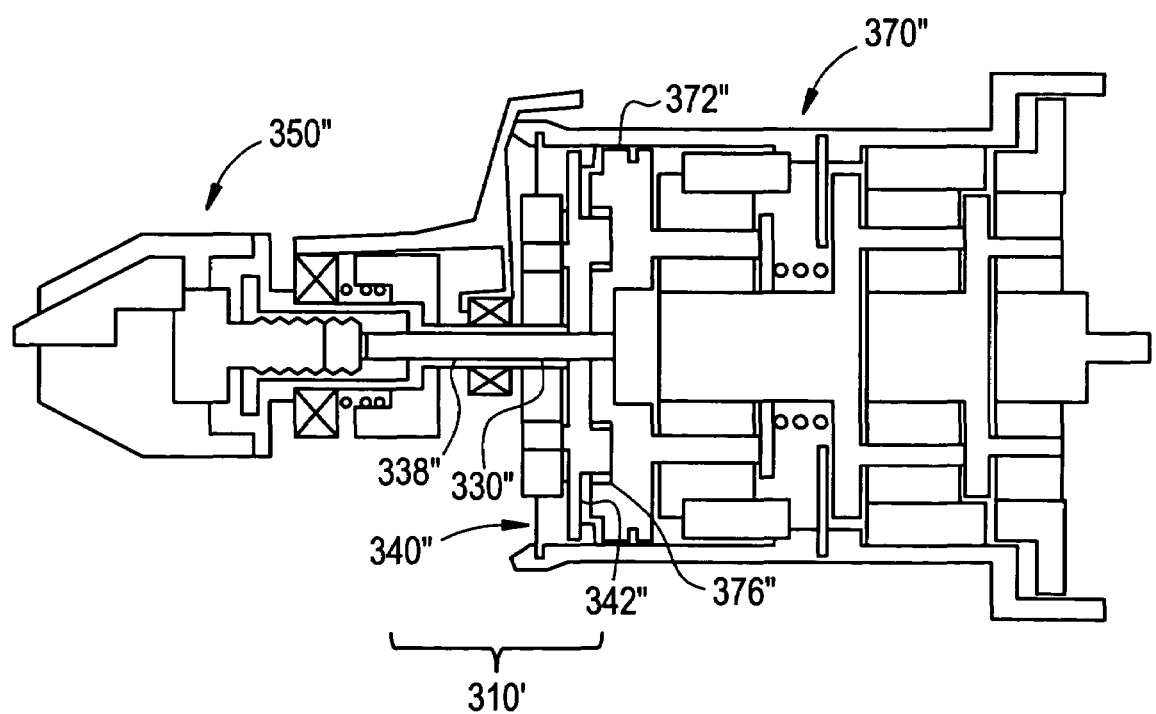

TOOL CHUCK WITH POWER TAKE OFF AND DEAD SPINDLE FEATURES

CROSS REFERENCE TO RELATED APPLICATIONS

This US non-provisional application claims priority under 35 USC §119 to U.S. Provisional Application No. 60/627,503 filed Apr. 19, 2005, the content of which is incorporated herein in its entirety by reference. This US non-provisional application is a Continuation-In-Part of Application No. 11/227,200 filed Sep. 16, 2005.

BACKGROUND

1. Field of the Invention

The present invention relates in general to tool chucks for attachment of accessories to power drivers, and more particularly to a tool chuck having chuck jaws that may be actuated via power from the driver's transmission.

2. Description of Related Art

Conventional tool chucks may have a turn ring that is rotatable using a chuck key to extend and retract chuck jaws. Although such tool chucks are generally thought to provide acceptable performance, they are not without shortcomings. For example, the conventional tool chuck requires cumbersome chuck key operations, chuck key retention, and other inconveniences.

In view of the shortcomings associated with chuck keys, tool chucks have been developed that have a turn ring (or sleeve) that is rotated manually, without using a chuck key, to tighten the chuck jaws. Other developments include a tool chuck that utilizes power from the power driver to open and close the chuck jaws. To this end, the tool chuck may be provided with a sleeve that is axially moveable to a position in which the sleeve is grounded (i.e., rotationally fixed) to the housing of the power driver. Thus, when the driver is powered up, a spindle of the driver (and consequently the chuck jaws) rotates relative to the sleeve. The relative rotation between the spindle and the sleeve may tighten or loosen the chuck jaws.

Conventional keyless tool chucks have associated disadvantages. For example, they require a user to manipulate the sleeve (i.e., rotate the sleeve and/or slide the sleeve axially). Such manipulations may be difficult, especially when the user attempts to simultaneously insert an accessory into the chuck jaws. Also, a user may inadvertently release a grounded condition between the sleeve and the tool housing when the tool is powered up.

SUMMARY

According to an example, non-limiting embodiments, a power driver may include a housing. A tool chuck may have an input shaft mounted for rotation on the housing and supporting chuck jaws. A chuck actuating shaft may be mounted for rotation on the input shaft. A power take off mechanism may be connected to the tool chuck. The power take off mechanism may be adjustable into a DRILL DRIVE MODE to rotationally drive the input shaft and the chuck actuating shaft together as a unit, and a CHUCK MODE to rotationally drive the chuck actuating shaft relative to the input shaft. The power take off mechanism may be internal of the housing.

According to another example, non-limiting embodiment, a power driver may include a tool chuck having an input shaft supporting threadless chuck jaws. A chuck actuating shaft may be mounted for rotation on the input shaft. Power take off means may be provided for adjusting into a DRILL DRIVE MODE to rotationally drive the input shaft and the chuck actuating shaft together as a unit, and a CHUCK MODE to rotationally drive the chuck actuating shaft relative to the input shaft.

According to another example, non-limiting embodiment, a power driver may include a tool chuck having an input shaft mounted for rotation on the housing and supporting chuck jaws. A chuck actuating shaft mounted for rotation on the input shaft. A power take off mechanism may have a power take off actuator shaft rotationally fixed to the chuck actuating shaft. An output coupling may be rotationally fixed to the input shaft. A power take off drive disk may be rotationally fixed to the power take off actuator shaft. A disk may confront the power take off drive disk. A shift ring may be mounted for movement to selectively engage to the output coupling, the power take off drive disk and the disk.

The above and other features of the invention including various and novel details of construction and combinations of parts will now be more particularly described with reference to the accompanying drawings. It will be understood that the details of the example embodiments are shown by way of illustration only and not as limitations of the invention. The principles and features of this invention may be employed in varied and numerous embodiments without departing from the spirit and scope of the invention.

BRIEF DESCRIPTION OF THE DRAWINGS

Example, non-limiting embodiments of the present invention will become more fully understood from the detailed description below and the accompanying drawings, wherein like elements are represented by like reference numerals, which are given by way of illustration only and thus are not limiting of the present invention.

FIGS. 24 and 25 are schematic views of a second example modification of the power take off mechanism illustrated in FIGS. 20 and 21.

DESCRIPTION OF EXAMPLE, NON-LIMITING EMBODIMENTS

I. Example Embodiment Depicted in FIGS. 1-4

Figure 1:
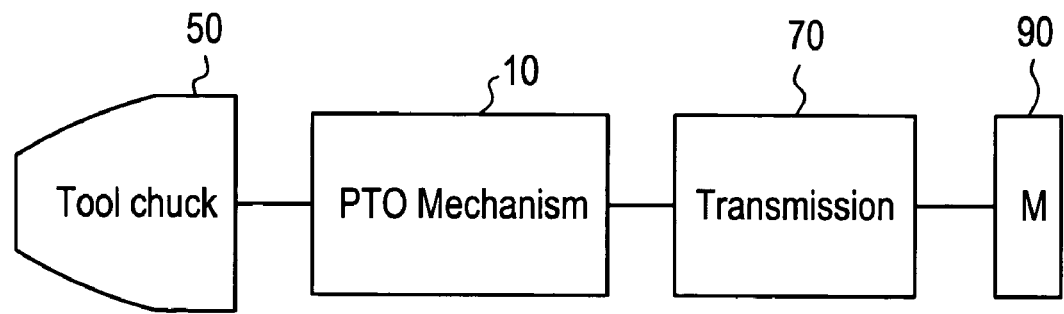
FIG. 1 is a schematic illustration of a tool chuck with a power take off mechanism according to an example, non-limiting embodiment of the present invention.

FIG. 1 schematically shows an example, non-limiting embodiment of a tool chuck 50 that may be provided on a power driver (e.g., a drill) for holding an accessory (e.g., a drill bit). It will be appreciated, however, that the tool chuck 50 may be suitably implemented on a variety of power drivers (other than drills) for holding a variety of accessories (other than drill bits).

The tool chuck 50 may be connected to the transmission 70 of a power driver via a power take off ("PTO") mechanism 10. The transmission 70 may be coupled to an electric motor 90. The transmission 70 may use gearing to effect a change in the ratio between an input rpm (from the electric motor 90) and an output rpm (delivered to the tool chuck 50).

In this example embodiment, the transmission 70 may include three planetary reduction systems. It will be appreciated, however, that the invention is not limited in this regard. For example, more or less than three planetary reduction systems may be implemented. Further, transmissions other than planetary reduction system transmissions (e.g., conventional parallel axis transmissions) may be suitably implemented. Planetary reduction transmissions are well known in this art, and therefore a detailed discussion of the same is omitted. The PTO mechanism 10 may be provided at the output of the transmission 70.

Figure 2:
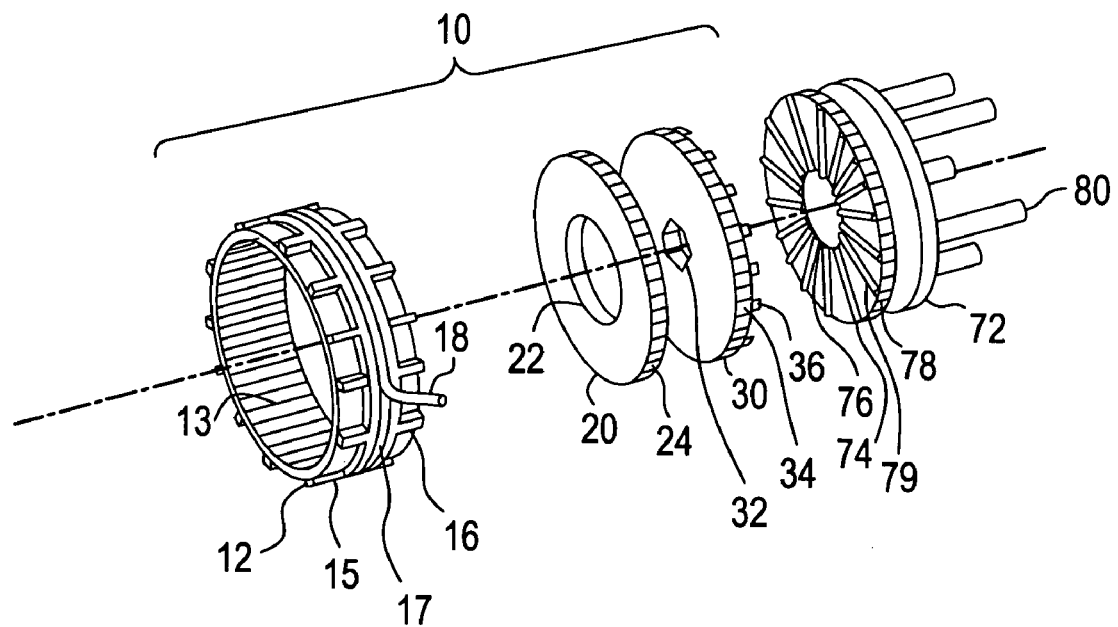
FIG. 2 is an exploded perspective view of the power take off mechanism of FIG. 1.

A. The Structure:

FIG. 2 is an exploded perspective view of the PTO mechanism 10. In this example embodiment, the PTO mechanism 10 may include a shift ring 12, an output coupling 20 and a PTO drive disk 30.

The shift ring 12 may have a radial inward facing surface provided with splines 13 (for selectively engaging with the output coupling 20, the PTO drive disk 30 and a disk 74 of the third stage carrier 72). The shift ring 12 may have a radial outward facing surface provided with forwardly extended splines 15 and rearwardly extended splines 16 (for selective engaging with a housing of the driver, not shown) and a continuous circumferential groove 17 (for accommodating a wire 18).

The wire 18, which may be slidable through the circumferential groove 17, may have free ends that extend in a radial direction and out of the circumferential groove 17. The fee ends of the wire 18 (serving as cam followers) may be received in a slot of a shift collar (not shown in FIG. 2) rotatably mounted on the driver housing. Upon rotating the shift collar, the slot may influence the cam followers (and thus the shift ring 12) to the desired axial positions, as will be discussed in more detail below.

The output coupling 20 may include a central aperture 22 having a shape that corresponds to the shape of an input shaft 60 (not shown in FIG. 2), discussed in more detail below. The output coupling 20 may have a radial outward facing surface provided with splines 24 that selectively cooperate with the radial inward facing splines 13 of the shift ring 12.

The PTO drive disk 30 may include a central aperture 32 having a shape that corresponds to the shape of a PTO actuator shaft (not shown in FIG. 2), discussed in more detail below. The PTO drive disk 30 may have a radial outward facing surface provided with splines 34 that selectively cooperate with the radial inward facing splines 13 of the shift ring 12. The PTO drive disk 30 may have an axial rearward facing surface provided with clutch features 36. In this example embodiment, the clutch features 36 may be in the form of elongated projections that extend in a radial fashion across the axial rearward facing surface of the PTO drive disk 30.

The disk 74 of the third stage carrier 72 may include a central aperture 76 that extends axially through the third stage carrier 72. The disk 74 may have a radial outward facing surface provided with splines 78 that selectively cooperate with the radial inward facing splines 13 of the shift ring 12. The disk 74 may also include an axial forward facing surface provided with clutch features 79. In this example embodiment, the clutch features 79 may be in the form of elongated projections that extend in a radial fashion across the axial forward facing surface of the disk 74. The clutch features 79 of the disk 74 may cooperate with the clutch features 36 of the PTO drive disk 30. As is well known in this art, the third stage carrier 72 may include shafts 80 that rotatably support planetary gears (not shown).

Figure 3:
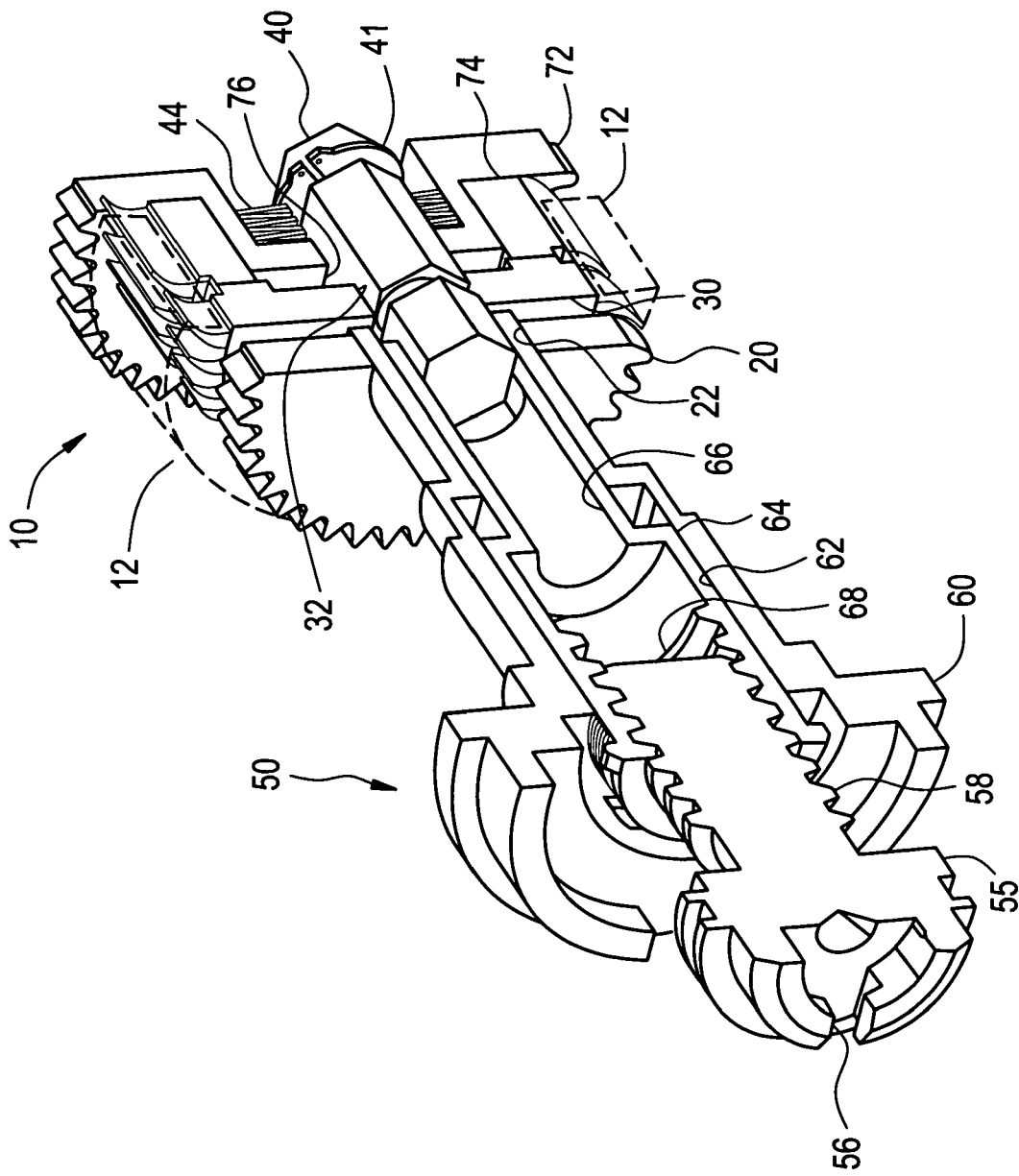
FIG. 3 is a sectional perspective view of the tool chuck mounted on the power take off mechanism of FIG. 1.

FIG. 3 is a sectional perspective view of the PTO mechanism 10 assembled together with the tool chuck 50. Here, the shift ring 12 is shown in phantom for clarity.

The tool chuck 50 may include an input shaft 60. A forward end of the input shaft 60 may support a nose portion (not shown) that may include passageways through which chuck jaws (not shown) are respectively slidable. The passageways of the nose portion may rotationally fix the input shaft 60 to the chuck jaws. The input shaft 60 may have a rear end that extends through the central aperture 22 of the output coupling 20. The rear end of the input shaft 60 may have a radial outward facing surface provided with features that cooperate with corresponding features provided on the radial inward facing surface defining the central aperture 22 so that the input shaft 60 may be rotationally locked to the output coupling 20. Such features are well known in this art. By way of example only, the input shaft 60 may be provided with flats against which flats of the central aperture 22 may abut to rotationally lock together the input shaft 60 and the output coupling 20. The input shaft 60 may include a through bore 62. The through bore 62 may rotatably support a chuck actuating shaft 64.

The chuck actuating shaft 64 may include a through bore 66. The through bore 66 may have a rear end receiving a PTO actuator shaft 40. The rear end of the through bore 66 and the PTO actuator shaft 40 may have corresponding shapes to rotationally fix the chuck actuating shaft 64 to the PTO actuator shaft 40. The forward end of the through bore 66 may be provided with radial inward facing threads 68 that may interact with radial outward facing threads 58 of a chuck actuating screw 55. That is, the chuck actuating shaft 64 may be screw coupled to the chuck actuating screw 55.

The chuck actuating screw 55 may include radial passageways 56 through which the chuck jaws are respectively slidable. The radial passageways 56 may rotationally fix the chuck actuating screw 55 to the chuck jaws. The interaction between the threads 58 and 68 may cause the chuck actuating screw 55 to advance and retract in the axial direction relative to the input shaft 60. It will be appreciated that the chuck actuating screw 55 and input shaft 60 may be rotationally locked together via the chuck jaws.

The PTO actuator shaft 40 extends through the through bore 66 of the chuck actuating shaft 64, the central aperture 32 of the PTO drive disk 30 and the central aperture 76 of the disk 74. A keeper 41 (in the form of a snap ring, for example) may be mounted on the PTO actuator shaft 40. A spring 44 may be mounted on the PTO actuator shaft 40 and compressed between the third stage carrier 72 and the keeper 41. The PTO actuator shaft 40 may support another keeper (not shown for clarity) via a slot located axially forward of the PTO drive disk 30. As noted above, the PTO actuator shaft 40 may have a shape that corresponds to the shape of the central aperture 32 of the PTO drive disk 30. In this way, the PTO actuator shaft 40 may be rotationally fixed to the PTO drive disk 30.

As shown in FIG. 3, the output coupling 20, the PTO drive disk 30 and the disk 74 of the third stage carrier 72 may be assembled together in a coaxial fashion. Here, the clutch features 36 of the PTO drive disk 30 may face (and engage with) the clutch features 79 of the disk 74. Also, the shift ring 12 (shown in phantom) may be mounted for axial movement so that the radial inward facing splines 13 of the shift ring 12 may selectively engage with the radial outward facing splines 24 of the output coupling 20, the radial outward facing splines 34 of the PTO drive disk 30 and the radial outward facing splines 78 of the disk 74.

B. The Operation:

The tool chuck 50 may operate differently depending on the axial position of shift ring 12, which may assume three different operating positions inclusive of a MANUAL OVERRIDE MODE, a DRILL/DRIVE MODE and a CHUCK MODE.

FIG. 3 illustrates the shift ring 12 in the MANUAL OVERRIDE MODE, in which the shift ring 12 may be located at an axial rearward position. Here, the radial outward facing splines 16 of the shift ring 12 may engage with corresponding features provided on the driver housing (not shown). Thus, the shift ring 12 may be rotationally fixed (or grounded) to the driver housing. The radial inward facing splines 13 of the shift ring 12 may engage with the radial outward facing splines 34 of the PTO drive disk 30 and the radial outward facing splines 78 of the disk 74. Thus, the shift ring 12, the PTO drive disk 30 (and therefore the PTO actuator shaft 40) and the disk 74 (and therefore the third stage carrier 72) may be rotationally grounded to the driver housing. In this condition, the output coupling 20 and the input shaft 60 may remain rotatable relative to the driver housing.

A user may grasp and manually rotate the input shaft 60 (together with the chuck jaws and the chuck actuating screw 55) relative to the driver housing. The chuck actuating screw 55 may rotate relative to the chuck actuating shaft 64, which may be rotationally fixed to the PTO actuator shaft 40 (and therefore may be rotationally grounded to the driver housing). This relative rotation may cause the chuck actuating screw 55 to advance or retract in the axial direction (depending on the rotation direction of the input shaft 60) by virtue of the interaction between the radially inward facing threads 68 and the radially outward facing threads 58. The translational movement of the chuck actuating screw 55 may push or pull on the chuck jaws to open or close the same.

For example, during a closing operation, the chuck actuating screw 55 (together with the chuck jaws) may be advanced in the axial direction. During this time, the passageways of the nose portion of the input shaft 60 may influence the chuck jaws 2 in a radial inward direction through the radial passageways 56 of the chuck actuating screw 55. This pusher type jaw action is well known in the pertinent art.

The DRILL/DRIVE MODE may be achieved by sliding the shift ring 12 forward (from its position in the MANUAL OVERRIDE MODE) to an intermediate axial position. Here, the shift ring 12 may be disengaged from (and rotatable relative to) the driver housing. The radial inward facing splines 13 of the shift ring 12 may engage with the radial outward facing splines 24 of the output coupling 20, the radial outward facing splines 34 of the PTO drive disk 30 and the radial outward facing splines 78 of the disk 74. Thus, the shift ring 12, the output coupling 20 (and therefore the input shaft 60), the PTO drive disk 30 and the disk 74 (and therefore the third stage carrier 72) may be rotationally fixed together and rotatable as a unit. Since the PTO drive disk 30 (and therefore the PTO actuator shaft 40 and the chuck actuating shaft 64) and the output coupling 20 (and therefore the input shaft 60 and the chuck actuating screw 55) may be rotationally locked together, the tool chuck 50 may not loosen during operation. A user may then power up the driver to rotationally drive the tool chuck 50.

The CHUCK MODE may be achieved by sliding the shift ring 12 (from its position in the DRILL/DRIVE MODE) to a forward axial position. Here, the radial outward facing splines 15 of the shift ring 12 may engage with corresponding features provided on the driver housing. Thus, the shift ring 12 may be rotationally grounded to the driver housing. The radial inward facing splines 13 of the shift ring 12 may engage with the radial outward facing splines 24 of the output coupling 20. Thus, the shift ring 12 and the output coupling 20 (and therefore the input shaft 60 and the chuck actuating screw 55) may be rotationally grounded to the driver housing. Here, the PTO drive disk 30 (and therefore the PTO actuator shaft 40 and the chuck actuating shaft 64) and the disk 74 (and therefore the third stage carrier 72) may remain rotatable relative to the driver housing.

A user may then power up the driver to actuate the tool chuck 50. At this time, the third stage carrier 72 may rotationally drive the PTO drive disk 30 via the cooperating clutch features 79 and 36 respectively provided on the confronting surfaces of the disk 74 and the PTO drive disk 30. The PTO drive disk 30 may rotationally drive the PTO actuator shaft 40, which in turn may rotationally drive the chuck actuating shaft 64. The chuck actuating shaft 64 may rotate relative to the chuck actuating screw 55, which may remain rotationally grounded to the driver housing (via the chuck jaws, the input shaft 60, the output coupling 20 and the shift ring 12). This relative rotation may cause the chuck actuating screw 55 to advance or retract in the axial direction (depending on the rotation direction of the chuck actuating shaft 64) by virtue of the interaction between the radial inward facing threads 68 and the radial outward facing threads 58. The translational movement of the chuck actuating screw 55 may push or pull on the chuck jaws to open or close the same.

During chuck actuation, the input shaft 60, the chuck jaws and the chuck actuating screw 55 may remain rotationally grounded to the driver housing, while the chuck actuating screw 55 may move axially (via the rotational movements of the chuck actuating shaft 64) relative to the input shaft 60 to open and close the chuck jaws. This may be referred to as a dead spindle feature since the user may not be exposed to (or observe) any rotating parts.

Once the tool chuck 50 is tight (i.e., when the chuck jaws clamp the accessory) or fully opened, the cooperating clutch features 79 and 36 respectively provided on the confronting surfaces of the disk 74 and the PTO drive disk 30 may give way and slip relative to each other. At this time, the disk 74 (together with the third stage carrier 72) may move in an axial rearward direction against the influence of the spring 44. When the cooperating clutch features 79 and 36 slip, they may produce an audible indication that the chuck actuation process is complete.

The cooperating clutch features 79 and 36 may give way or slip at a predetermined torque threshold. The predetermined torque threshold may be suitably adjusted by selecting an appropriate spring 44 and/or by suitably designing the geometries of the cooperating clutch features 79 and 36. Further, the predetermined torque threshold for tightening the tool chuck 50 may be less than the predetermined torque threshold for loosening the tool chuck 50. This feature may be obtained by suitably designing the geometries of the cooperating clutch features 79 and 36. Numerous and varied clutch surface geometries are well known in this art, and therefore a detailed discussion of the same is omitted.

Figure 4:
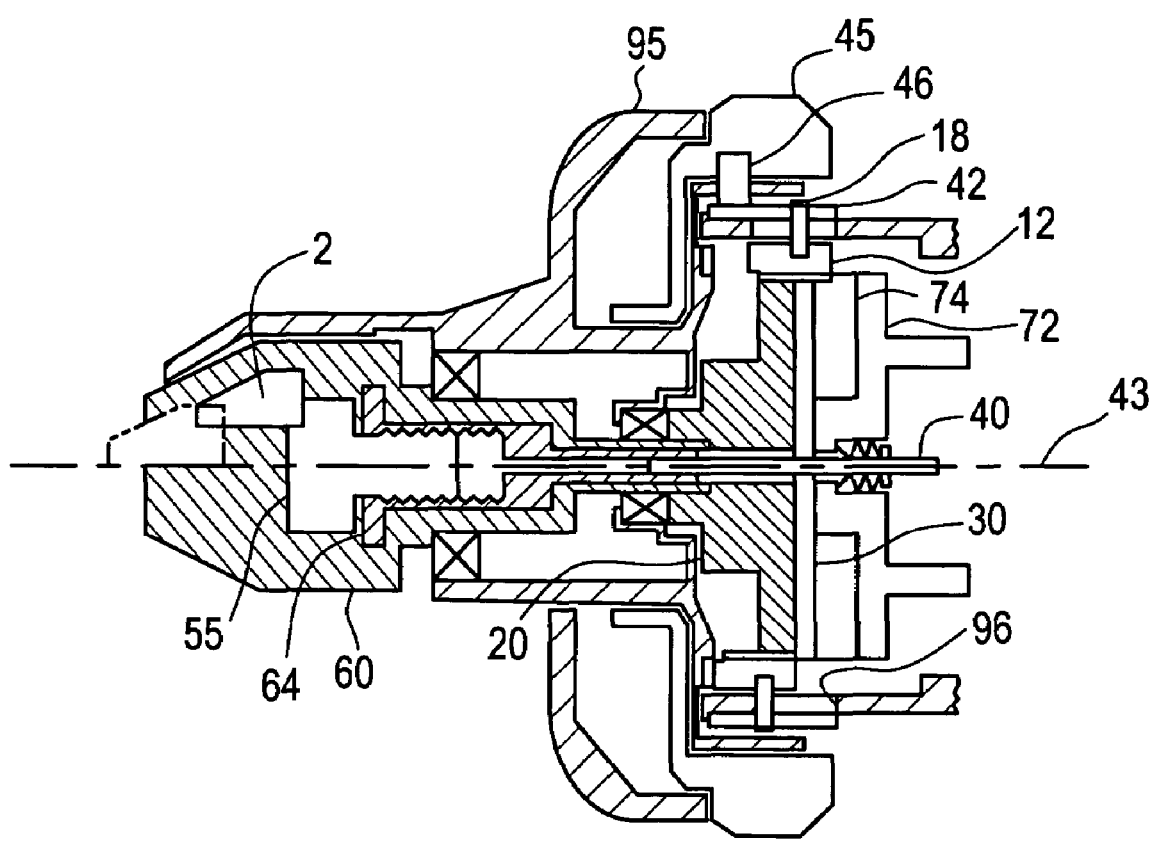
FIG. 4 is a sectional view of a mode ring and shift collar that may be suitably implemented to change the operational modes of the tool chuck.

C. The Shift Collar/Mode Ring:

FIG. 4 shows an example, non-limiting embodiment of a mode ring 45 and a shift collar 42 that may be implemented to axially position the shift ring 12 depicted in FIGS. 2 and 3 to achieve the various operational modes. In FIG. 4, the portion of the drawing above the axis 43 depicts the DRILL/DRIVE MODE (where the shift ring 12 may be located at the intermediate axial position), and the portion of the drawing below the axis 43 depicts the CHUCK MODE (where the shift ring 12 may be located at the forward axial position).

The mode ring 45 and the shift collar 42 may be mounted for rotation on the driver housing 95. The mode ring 45 and the shift collar 42 may be rotationally fixed together via a radial extension 46. Thus, the mode ring 45 and the shift collar 42 may be rotatable together relative to the driver housing 95.

The shift collar 42 may include a slot that extends in a circumferential direction around the shift collar 42. In this example embodiment, the shift collar 42 may include two circumferential slots. The driver housing 95 may include longitudinal slots 96. The longitudinal slots 96 may extend across (and underneath) the circumferential slots of the shift collar 42. The ends of the wire 18 may extend in a radial outward direction from the shift ring 12, through the longitudinal slots 96 of the driver housing 95 and into the slots of the shift collar 42.

A user may rotate the mode ring 45 (and thus the shift collar 42) relative to the housing 95. At this time, the wire 18 may remain rotationally fixed to the housing 95 via the longitudinal slots 96. During this relative rotation, the ends of the wire 18 may slide through the circumferential slots of the shift collar 42. The shapes of the circumferential slots of the shift collar 42 may influence the wire 18 (and thus the shift ring 12) to the desired axial position. In this regard, the ends of the wire 18 may serve as cam followers and the corresponding circumferential slots may serve as cams. It will be appreciated that the circumferential slots of the shift collar 42 may extend in axial directions to thereby axially displace the shift ring 12.

II. Example Embodiment Depicted in FIGS. 5-9

FIGS. 5-9 show another example, non-limiting embodiment of a PTO mechanism 110 that may support a tool chuck 150. This example embodiment is similar to the one noted in section I above to the extent that it provides a dead spindle feature when operated in a CHUCK MODE, but there are some notable differences.

Figure 5:
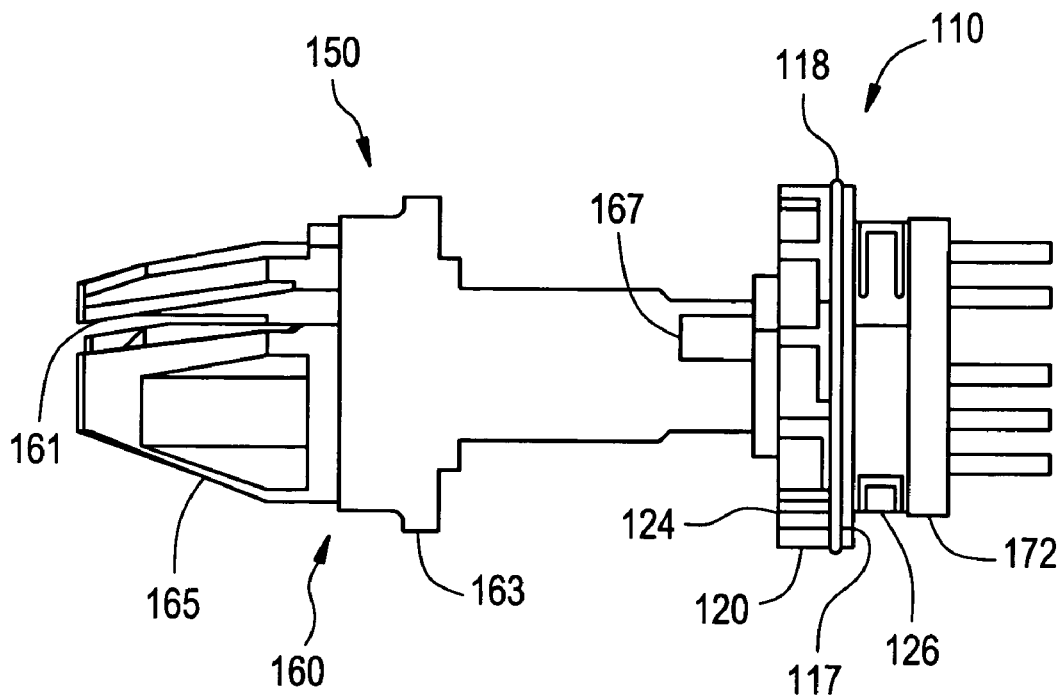
FIGS. 5-9 are schematic views of a tool chuck with a power take off mechanism according to another example, non-limiting embodiment of the present invention.
Figure 6:
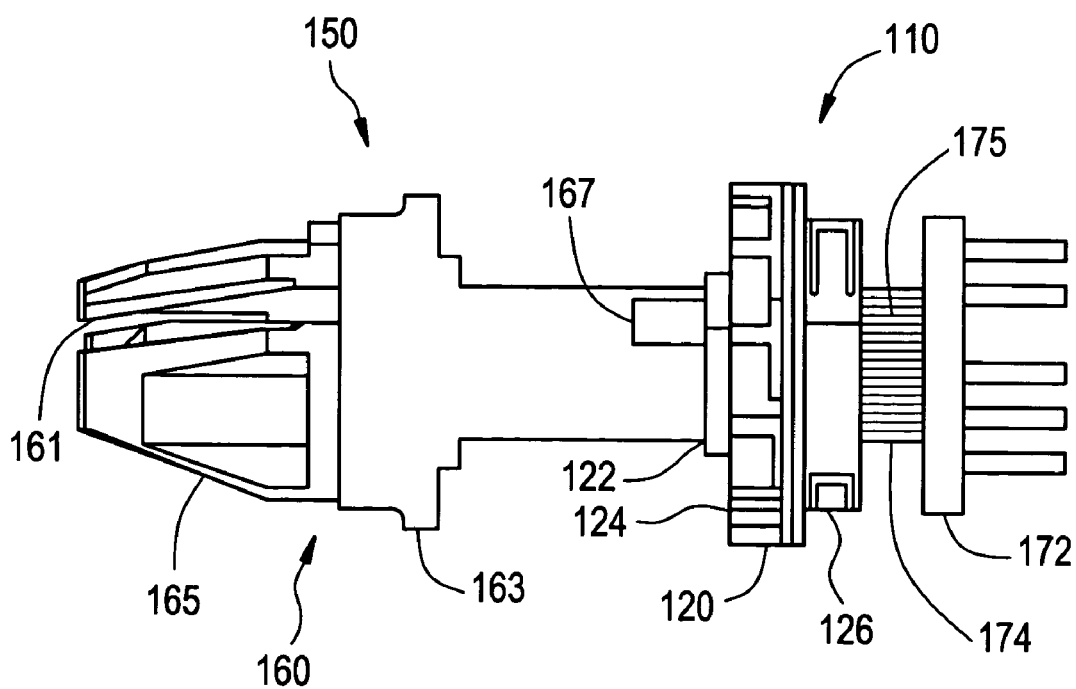

A. The Structure:

With reference to FIGS. 5 and 6, the PTO mechanism 110 may include an output coupling 120. The output coupling 120 may have a radial outward facing surface provided with forwardly extended splines 124 (for selectively engaging with a driver housing, not shown), and a continuous circumferential groove 117 (for accommodating a wire 118).

The wire 118, which may be slidable through the circumferential groove 117, may have free ends that extend in a radial direction and out of the circumferential groove 117. The free ends of the wire 118 (serving as cam followers) may be received in a slot a shift collar rotatably mounted on the driver housing. Upon rotating the shift collar (via a mode ring, which may be similar to the one discussed above in section I), the slot may influence the cam followers (and thus the output coupling 120) to the desired axial positions. In FIG. 5, the output coupling 120 may be located in axial rearward position (to achieve a DRILL/DRIVE MODE), and in FIG. 6, the output coupling 120 may be located in an axial forward position (to achieve a CHUCK MODE).

The output coupling 120 may include a central aperture 122 for receiving an end of an input shaft 160. The central aperture 122 may have a shape corresponding to the shape of the input shaft 160. By way of example only, a wall defining the central aperture 122 may include flats that abut against flats 167 provided on the input shaft 160. In this way, the output coupling 120 may be rotationally fixed to (and axial moveable relative to) the input shaft 160.

Figure 7:
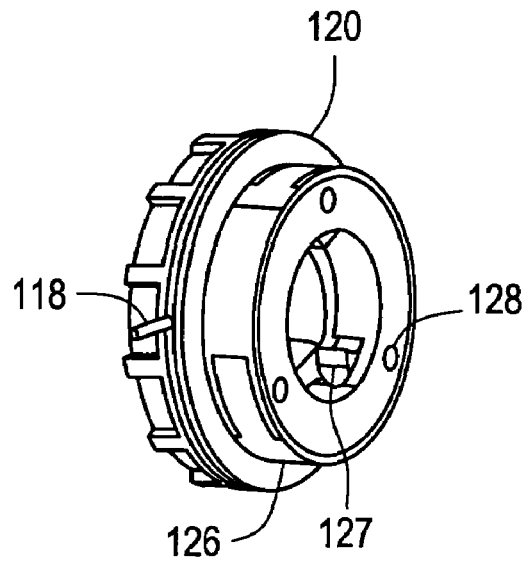
Figure 8:
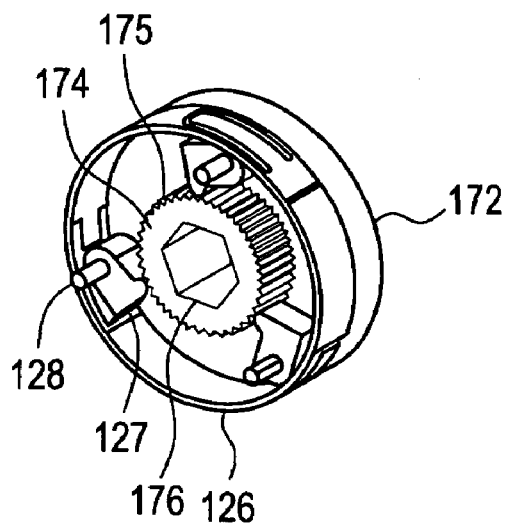

The output coupling 120 may rotatably support pawls 127 (see FIGS. 7 and 8). A spring 126, mounted on the radial outward facing surface of the output coupling 120, may bias the pawls 127 in a radial inward direction. The pawls 127 may selectively engage with ratchet features 175 provided on a radial outward facing surface of a disk 174.

FIGS. 7 and 8 illustrate the cooperation between the pawls 127 of the output coupling 120 and the ratchet features 175 of the disk 174. As shown, the output coupling 120 may include radial openings into which shafts 128 may extend. The pawls 127, which may be respectively provided in the radial openings, may be rotatably mounted on the shafts 128. In FIG. 8, only the shafts 128 and the pawls 127 of the output coupling 120 are illustrated for clarity.

As in the previous embodiment, a transmission may include a planetary reduction system. The disk 174 may be fixed to a third stage carrier 172. The third stage carrier 172 may include a central aperture 176 having a shape that corresponds to a shape of a chuck actuating shaft (not shown). In this way, the third stage carrier 172 (and thus the disk 174) may be rotationally fixed to the chuck actuating shaft.

Figure 9:
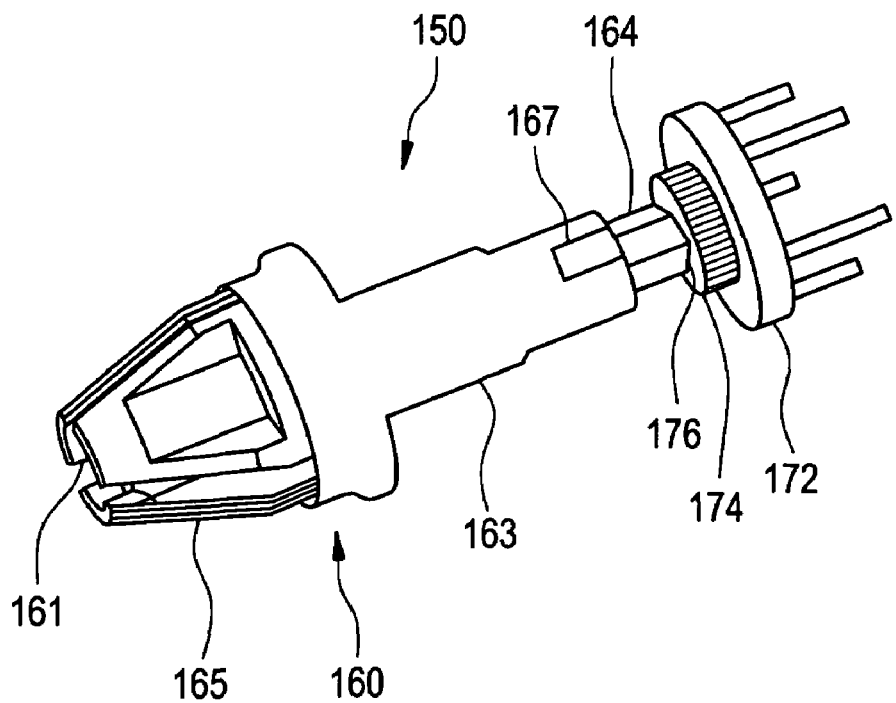

Turning to FIG. 9, which does not illustrate the output coupling 120 for clarity, the tool chuck 150 may be somewhat similar to the one described in section I above. For example, the tool chuck 150 may include the input shaft 160. As shown, the input shaft 160 may include two component parts inclusive of a nose portion 165 and a main body portion 163 that may be press fitted together, for example. The nose portion 165 may include passageways 161 through which chuck jaws (not shown) are respectively slidable. The input shaft 160 may include a through bore that rotatably supports a chuck actuating shaft 164.

In this example embodiment, the rear end of the chuck actuating shaft 164 extends from the input shaft 160 and into the central aperture 176 of the third stage carrier 172. As noted above, the chuck actuating shaft is rotationally fixed to the third stage carrier 172. The chuck actuating shaft 164 may include a through bore, the forward end of which may be provided with radial inward facing threads that may interact with radial outward facing threads of a chuck actuating screw (not shown). That is, the chuck actuating shaft may be screw coupled to the chuck actuating screw.

As described above in section I, the chuck actuating screw may include radial passageways through which the chuck jaws are respectively slidable. The radial passageways may rotationally fix the chuck actuating screw to the chuck jaws. The chuck actuating screw and the input shaft 160 may be rotationally locked together via the chuck jaws.

B. The Operation:

The tool chuck 150 may operate differently depending on the axial position of the output coupling 120, which may assume two different operating positions inclusive of a DRILL/DRIVE MODE (as shown in FIG. 5) and a CHUCK MODE (as shown in FIG. 6).

As shown in FIG. 5, the output coupling 120 may located at an axial rearward position to achieve the DRILL/DRIVE MODE. Here, the output coupling 120 may be disengaged from (and rotatable relative to) the driver housing. The pawls 127 of the output coupling 120 may engage with the radial outward facing ratchet features 175 of the disk 174 (as shown in FIG. 8). Thus, the output coupling 120 (and therefore the input shaft 160, the chuck jaws and the chuck actuating screw) and the disk 174 (and therefore the third stage carrier 172) may be rotatable together as a unit, relative to the driver housing. A user may then power up the driver to rotationally drive the tool chuck 150.

The pawls 127 of the output coupling 120 may interact with the ratchet features 175 of the disk 174 so that the tool chuck 150 may tighten when driven in a forward direction as application torque increases, and may not loosen when driven in a reverse direction.

With respect to the tightening feature, the third stage carrier 172 (together with the disk 174) may rotationally drive the output coupling 120 (together with the input shaft 160, the chuck jaws and the chuck actuating screw). As the application torque increases, a rotational force applied by the ratchet features 175 of the disk 174 to the pawls 127 of the output coupling 120 may increase. This rotational force may increase to a threshold at which the ratchet features 175 may drive the pawls 127 in a radial outward direction and against the influence of the spring 126, thereby causing the pawls 127 to rotate about the shafts 128. In FIG. 8, the pawls 127 would rotate in a clockwise direction about the shafts 128. At this time, the third stage carrier 172 (and thus the disk 174 and the chuck actuating shaft 164) may rotate relative to the output coupling 120 (and thus the input shaft 160, the chuck jaws and the chuck actuating screw). The relative rotation between the chuck actuating shaft 164 and the chuck actuating screw (which may be screw coupled together) may cause the chuck jaws to tighten on the accessory.

With respect to loosening, the driver may be operated in a reverse direction. Here, the ratchet features 175 of the disk 174 may apply a rotational force to the pawls 127 of the output coupling 120. In this case, however, and with reference to FIG. 8, the pawls 127 may not rotate in a counter clockwise direction about the shafts 128. This is due to the elongated shape of the pawls 128 and because of the radial location of the shafts 128. Thus, the chuck actuating shaft 164 and the chuck actuating screw may remain rotationally locked together when the power driver is operated in the reverse direction.

As shown in FIG. 6, the output coupling 120 may located at an axial forward position to achieve the CHUCK MODE. Here, the radial outward facing splines 124 of the output coupling 120 may engage with corresponding features provided on the driver housing. Thus, the output coupling 120 (and therefore the input shaft 160 and the chuck actuating screw) may be rotationally grounded to the driver housing. The pawls 127 of the output coupling 120 may be disengaged from ratchet features 175 of the disk 174 so that the disk 174 is rotatable relative to the output coupling 120.

A user may then power up the driver to actuate the tool chuck 150. At this time, the third stage carrier 172 may rotationally drive the disk 174 and the chuck actuating shaft 164. The chuck actuating shaft 164 may rotate relative to the chuck actuating screw, which may remain rotationally grounded to the driver housing (via the chuck jaws, the input shaft 160 and the output coupling 120). This relative rotation may cause the chuck actuating screw to advance or retract in the axial direction (depending on the rotation direction of the chuck actuating shaft 164). The translational movement of the chuck actuating screw may push or pull on the chuck jaws to open or close the same.

As in the embodiment discussed above in section I, this embodiment also provides a dead spindle feature. For example, during chuck actuation, the input shaft 160, the chuck jaws and the chuck actuating screw may remain rotationally grounded to the driver housing, while the chuck actuating screw may move axially (via the rotational movements of the chuck actuating shaft 164) relative to the input shaft 160 to open and close the chuck jaws.

C. Example Modification for Shift Ring—FIGS. 10-13:

FIGS. 10-13 illustrate an example modification of the PTO mechanism depicted shown in FIGS. 5-9. Here, the PTO mechanism 110' may additionally include an axially moveable shift ring 112, and the output coupling 120' may remain axially fixed to the input shaft 160'.

Figure 10:
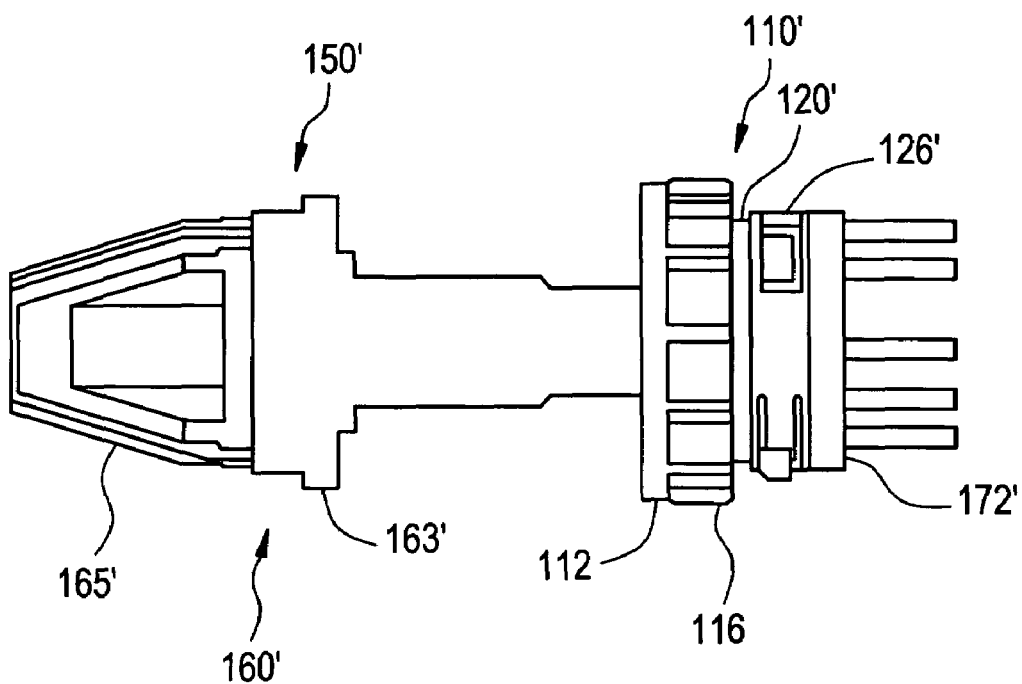
FIGS. 10-13 are schematic views of an example modification of the power take off mechanism illustrated in FIGS. 5-9.
Figure 11:
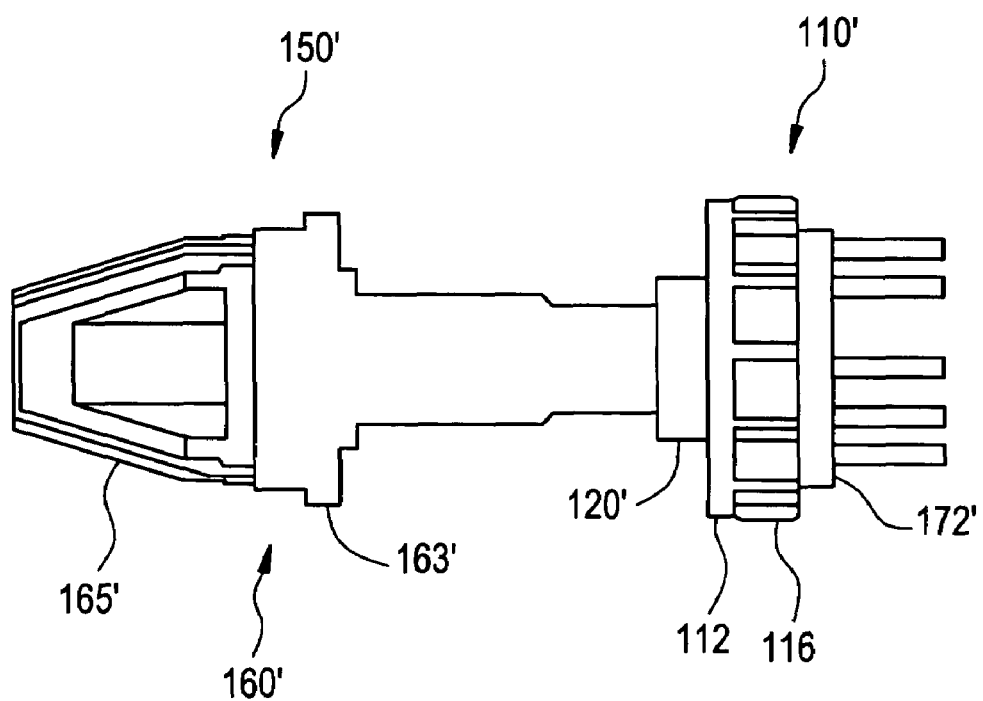

With reference to FIGS. 10 and 11, the shift ring 112 may have a radial outward facing surface provided with splines 116 (for selectively engaging with a driver housing, not shown), and a continuous circumferential groove (not shown) for accommodating a wire. The free ends of the wire may be received in a slot of a shift collar rotatably mounted on the driver housing. Upon rotating the shift collar (via a mode ring, for example), the slot may influence the cam followers (and thus the shift ring 112) to the desired axial positions. In FIG. 10, the shift ring 112 may be located in an axial forward position (to achieve a DRILL/DRIVE MODE), and in FIG. 11, the shift ring 112 may be located in an axial rearward position (to achieve a CHUCK MODE).

Figure 12:
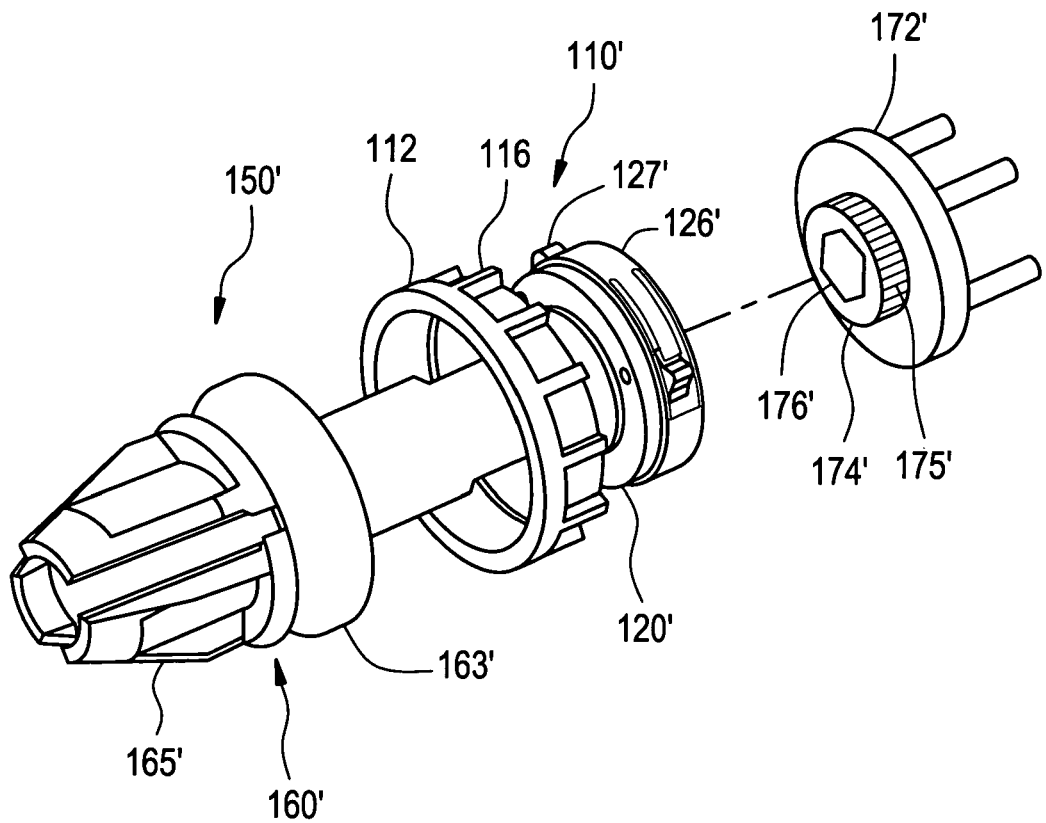
Figure 13:
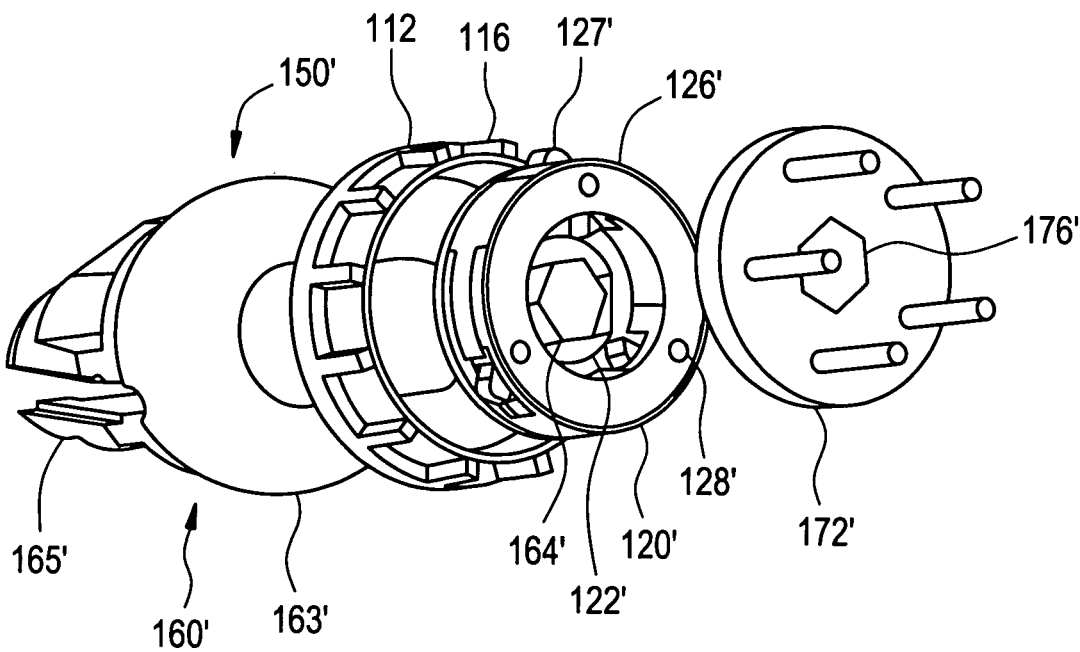

Turning to FIGS. 12 and 13, the output coupling 120' may include a central aperture 122' having a shape corresponding to the shape of the input shaft 160' so that the output coupling 120' may be rotationally fixed to the input shaft 160'. In this example modification, the output coupling 120' may also be axially fixed to the input shaft 160' by features that are well known in this art.

The output coupling 120' may rotatably support pawls 127'. And a spring 126', mounted on the radial outward facing surface of the output coupling 120', may bias the pawls 127' in a radial inward direction. The pawls 127' may engage with ratchet features 175' provided on a radial outward facing surface of a disk 174'. Since the output coupling 120' may be axially fixed, the pawls 127' may remain engaged with the ratchet features 175'. As described in more detail below, the pivot action of the pawls 127' about the shafts 128' may be selectively enabled/disabled via the axial location of the shift ring 112.

The disk 174' may be fixed to a third stage carrier 172'. The third stage carrier 172' may include a central aperture 176' having a shape that corresponds to a shape of a chuck actuating shaft 164' so that the third stage carrier 172' (and thus the disk 174') may be rotationally fixed to the chuck actuating shaft 164'.

The tool chuck 150 may be similar to the one described in section II A above.

The example modification may operate differently depending on the axial position of the shift ring 112, which may assume two different operating positions inclusive of a DRILL/DRIVE MODE (as shown in FIG. 10) and a CHUCK MODE (as shown in FIG. 11).

As shown in FIG. 10, the shift ring 112 may be located at an axial forward position to achieve the DRILL/DRIVE MODE. Here, the shift ring 112 may be disengaged from (and rotatable relative to) the driver housing. In this condition, a radial inward facing surface of the shift ring 112 may not abut against and prevent the pawls 127' from disengaging from the ratchet features 175'. In this respect, the pawls 127' may be considered as being "enabled" to the extent that they may (given an appropriate application torque) rotate about the shafts 128'. A user may then power up the driver to rotationally drive the tool chuck 150'.

The pawls 127' of the output coupling 120' may interact with the ratchet features 175' of the disk 174' so that the tool chuck 150' may tighten when driven in a forward direction as application torque increases, and may not loosen when driven in a reverse direction. In this regard, the functional aspects of the example modification are similar to those discussed above in section II B.

As shown in FIG. 11, the shift ring 112 may located at an axial rearward position to achieve the CHUCK MODE. Here, the radial outward facing splines 116 of the shift ring 112 may engage with corresponding features provided on the driver housing. Thus, the shift ring 112 (and therefore the input shaft 160' and the chuck actuating screw) may be rotationally grounded to the driver housing.

The shift ring 112 may cover the outer circumference of the output coupling 120'. In this condition, a radial inward facing surface of the shift ring 112 may contact a tail end of the pawls 127', causing the pawls 127' to rotate (clockwise when viewed from the front of the driver) about the shafts 128' and completely out of engagement from the ratchet feature 175'. This may "disable" the ratcheting and anti-reverse characteristics of the pawl mechanism so that the tool chuck 150' may be loosened freely with a counter-clockwise rotation of the third stage carrier 172' (and thus the disk 174').

A user may then power up the driver to actuate the tool chuck 150'. At this time, the third stage carrier 172' may rotationally drive the disk 174' and the chuck actuating shaft 164'. The chuck actuating shaft 164' may rotate relative to the chuck actuating screw, which may remain rotationally grounded to the driver housing (via the chuck jaws, the input shaft 160', the output coupling 120' and the shift ring 112). This relative rotation may cause the chuck actuating screw to advance or retract in the axial direction (depending on the rotation direction of the chuck actuating shaft 164') to open or close the chuck jaws.

This example modification may also provide a dead spindle feature. For example, during chuck actuation, the input shaft 160', the chuck jaws and the chuck actuating screw may remain rotationally grounded to the driver housing, while the chuck actuating screw may move axially (via the rotational movements of the chuck actuating shaft 164') relative to the input shaft 160' to open and close the chuck jaws.

III. Example Embodiment Depicted in FIGS. 14-16

Figure 14:
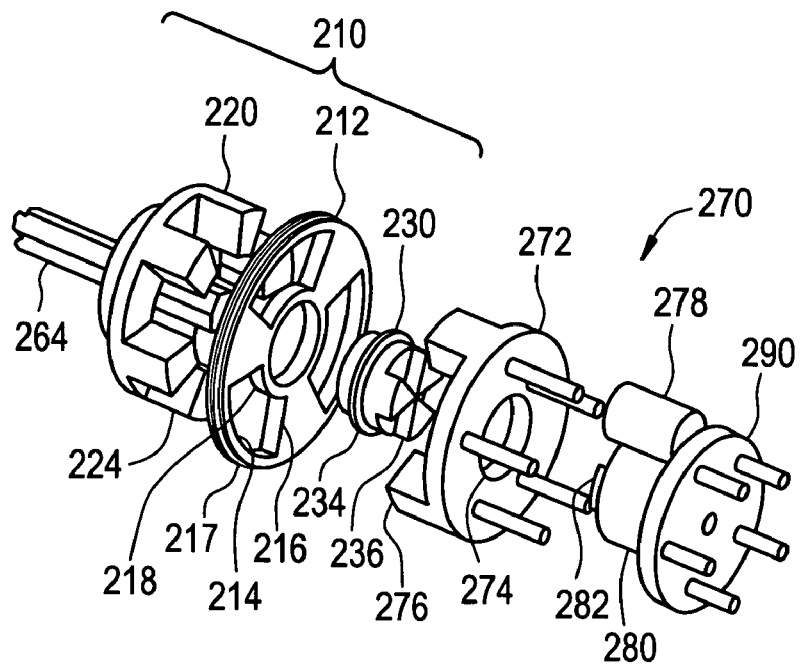
FIGS. 14-16 are schematic views of a tool chuck with a power take off mechanism according to another example, non-limiting embodiment of the invention.
Figure 15:
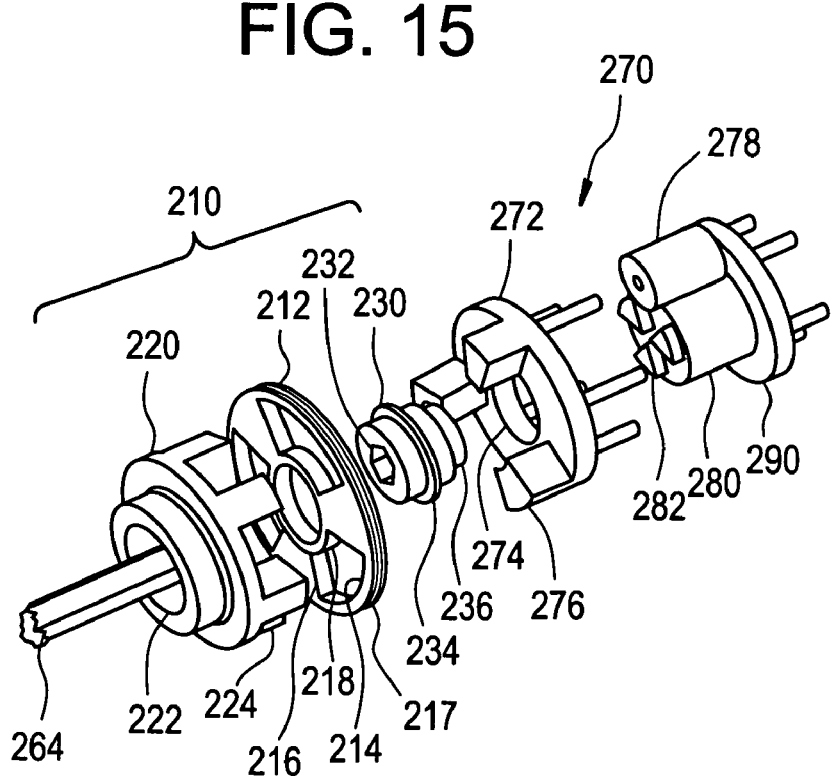
Figure 16:
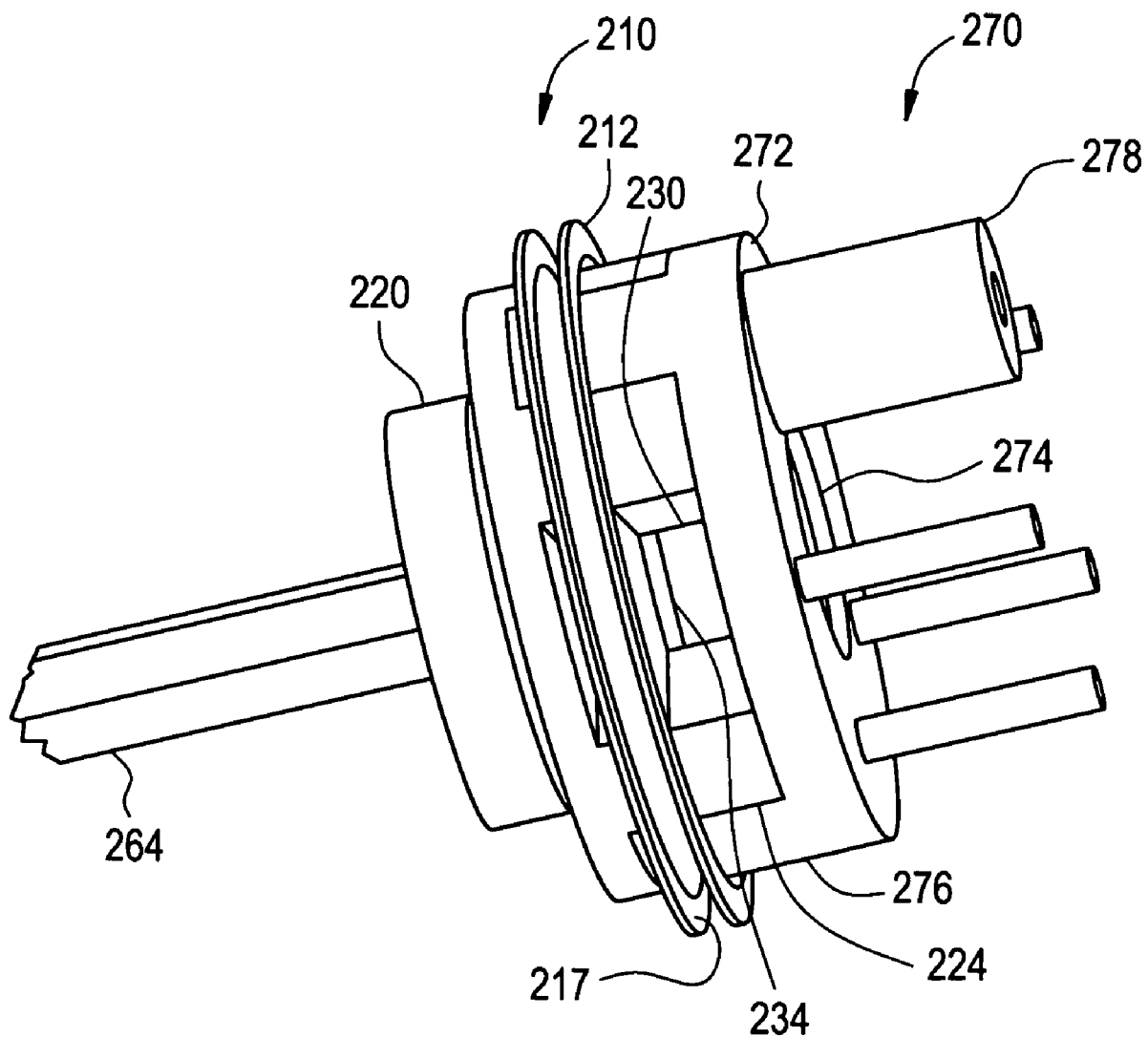

FIGS. 14-16 show another example, non-limiting embodiment of a PTO mechanism 210 that may support a tool chuck. As in the previous embodiments, the PTO mechanism 210 may be provided at the output end of the transmission 270 and have elements that may be positioned to operate the tool chuck in various modes. However, there are some notable differences.

A. The Structure:

With reference to FIGS. 14 and 15, the PTO mechanism 210 may include an output coupling 220, a shift spider 212, and a shift coupling 230.

The output coupling 220 may include a central aperture 222 having a shape that corresponds to the shape of an input shaft (not shown) of the tool chuck. In this way, the output coupling 220 may be rotationally fixed to the input shaft. The output coupling 220 may include lugs 224.

The shift spider 212 may have a radial outward facing surface provided with a continuous circumferential groove 217 for accommodating a wire (not shown). The free ends of the wire may be received in a slot of a shift collar rotatably mounted on the driver housing. Upon rotating the shift collar (via a mode ring, for example), the slot may influence the cam followers (and thus the shift spider 212) to the desired axial positions, as will be discussed in more detail below.

The shift spider 212 may include lug openings 214 through which the lugs 224 of the output coupling 220 extend. The lug openings 214 may be separated from each other via radial extending tabs 216. The radial inner ends of the tabs 216 may support a drive ring 218.

The shift coupling 230 may include a central aperture 232 having a shape that corresponds to the shape of a chuck actuating shaft 264 (which is only partially shown in FIGS. 14-16) of the tool chuck. In this way, the shift coupling 230 may be rotationally fixed to (and axially moveable with respect to) the chuck actuating shaft 264. The shift coupling 230 may have a radial outward facing surface supporting a flange 234. The axial forward facing surface of the flange 234 may cooperate with the drive ring 218 of the shift spider 212, as will be discussed in more detail below. The axial rearward facing surface of the flange 234 may support a spring (not shown) that may influence the shift coupling 230 in an axial forward direction. The shift coupling 230 may have an axial rearward facing surface that support lugs 236.

The transmission 270 may include three planetary reduction systems. The third stage carrier 272 may have a central aperture 274 into which the lugs 236 of the shift coupling 230 may extend. The third stage carrier 272 may have an axial forward facing surface that supports drive lugs 276. The drive lugs 276 may extend through the lug openings 214 of the shift spider 212 and engage with the lugs 224 of the output coupling 220. In this way, the third stage carrier 272 may be rotationally fixed to the output coupling 220.

The third stage sun gear 280 may be mounted on the second stage carrier 290. The third stage sun gear 280 may have an axial forward facing surface supporting drive lugs 282. The drive lugs 282 may extend into the central aperture 274 of the third stage carrier 272 and selectively engage with the lugs 236 of the shift coupling 230.

In this example embodiment, the tool chuck may be similar to those described with respect to the previous embodiments. Here, however, the rear end of the chuck actuating shaft 264 may extend from the input shaft and into the central aperture 232 of the shift coupling 230. As noted above, the shift coupling 230 may be rotationally fixed to (and axially moveable relative to) the chuck actuating shaft 264.

B. The Operation:

The tool chuck may operate differently depending on the axial position of the shift spider 212, which may assume two different operating positions inclusive of a DRILL/DRIVE MODE and a CHUCK MODE. The axial movements of the shift spider 212 will be appreciated with reference to FIG. 16.

The shift spider 212 may be located at an axial forward position to achieve the DRILL/DRIVE MODE. Here, the spring (not shown) abutting against the axial rearward facing surface of the flange 234 of the shift coupling 230 may influence the shift coupling 230 to move axially along the chuck actuating shaft 264 to an axial forward position. The drive ring 218 of the shift spider 212 (abutting against the axial forward facing surface of the flange 234) may limit the axial forward travel of the shift coupling 230. In this condition, the lugs 236 of the shift coupling 230 may be disengaged from the drive lugs 282 of the third stage sun gear 280.

A user may then power up the driver. At this time, the third stage sun gear 280 may rotationally drive the third stage carrier 272 (via third stage planetary gears 278), which in turn may rotationally drive the output coupling 220 (via the interacting lugs 276 and 224). The output coupling 220 may rotationally drive the tool chuck (by virtue of being rotationally fixed to the input shaft). The chuck actuating shaft 264 (together with the shift coupling 230) may rotate relative to the third stage sun gear 280.

The shift spider 212 may be located at an axial rearward position to achieve the CHUCK MODE. Here, the drive ring 218 (of the shift spider 212) abutting against the axial forward facing surface of the flange 234 may drive the shift coupling 230 axially along the chuck actuating shaft 264 (and against the influence of the spring) to an axial rearward position. In this condition, the lugs 236 of the shift coupling 230 may engage with the drive lugs 282 of the third stage sun gear 280 so that the shift coupling 230 may be rotationally fixed to the third stage sun gear 280.

A user may then power up the driver. At this time, the third stage sun gear 280 may rotationally drive the third stage carrier 272 (via third stage planetary gears 278, only one of which is depicted for clarity), which in turn may rotationally drive the output coupling 220 (via the interacting lugs 276 and 224). The output coupling 220 may rotationally drive the input shaft (and thus the chuck jaws and the chuck actuating screw). At the same time, the third stage sun gear 280 may rotationally drive the shift coupling 230 (via the interacting lugs 282 and 236), which in turn may rotationally drive chuck actuating shaft 264.

As is well known in this art, one rotation of the third stage sun gear 280 may cause (via the third stage planetary gears 278) only a fractional rotation of the third stage carrier 272. In other words, relative to the driver housing, the third stage sun gear 280 (and thus the shift coupling 230 and the chuck actuating shaft 264) may rotate faster than the third stage carrier 272 (and thus the output coupling 220, the chuck input shaft, the chuck jaws and the chuck actuating screw). The speed differential between the rotationally driven chuck actuating shaft 264 and the rotationally driven chuck actuating screw may result in a relative rotation between these two component parts. This relative rotation may advance or retract the chuck actuating screw in the axial direction (depending on the rotation direction of the transmission 270 output) to open or close the chuck jaws.

When the tool chuck tightens on an accessory, the rotational movements of the input shaft, the chuck jaws, the chuck actuating screw and the chuck actuating shaft 264 stops. This stop when tight feature may be referred to as a semi-dead spindle feature.

C. Example Modification for Dead Spindle Feature—FIGS. 17-19

Figure 17:
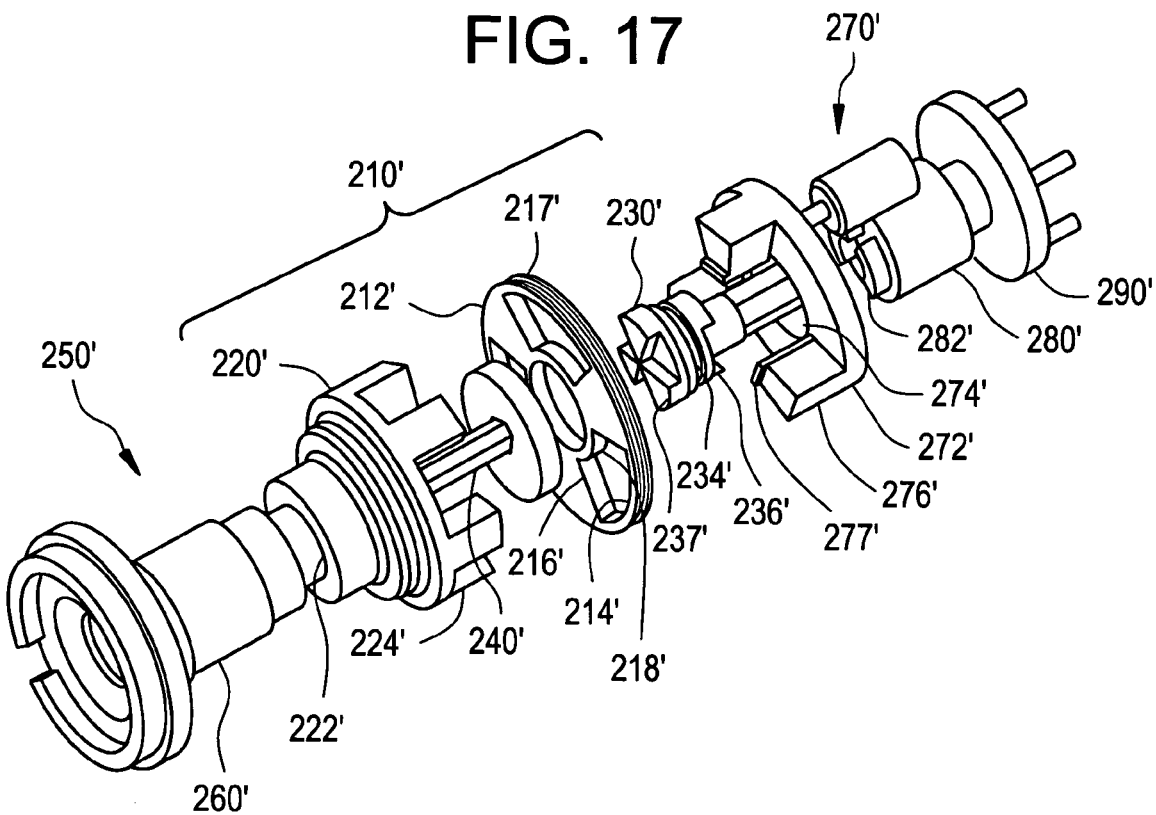
FIGS. 17-19 are schematic views of an example modification of the power take off mechanism illustrated in FIGS. 14-16.
Figure 18:
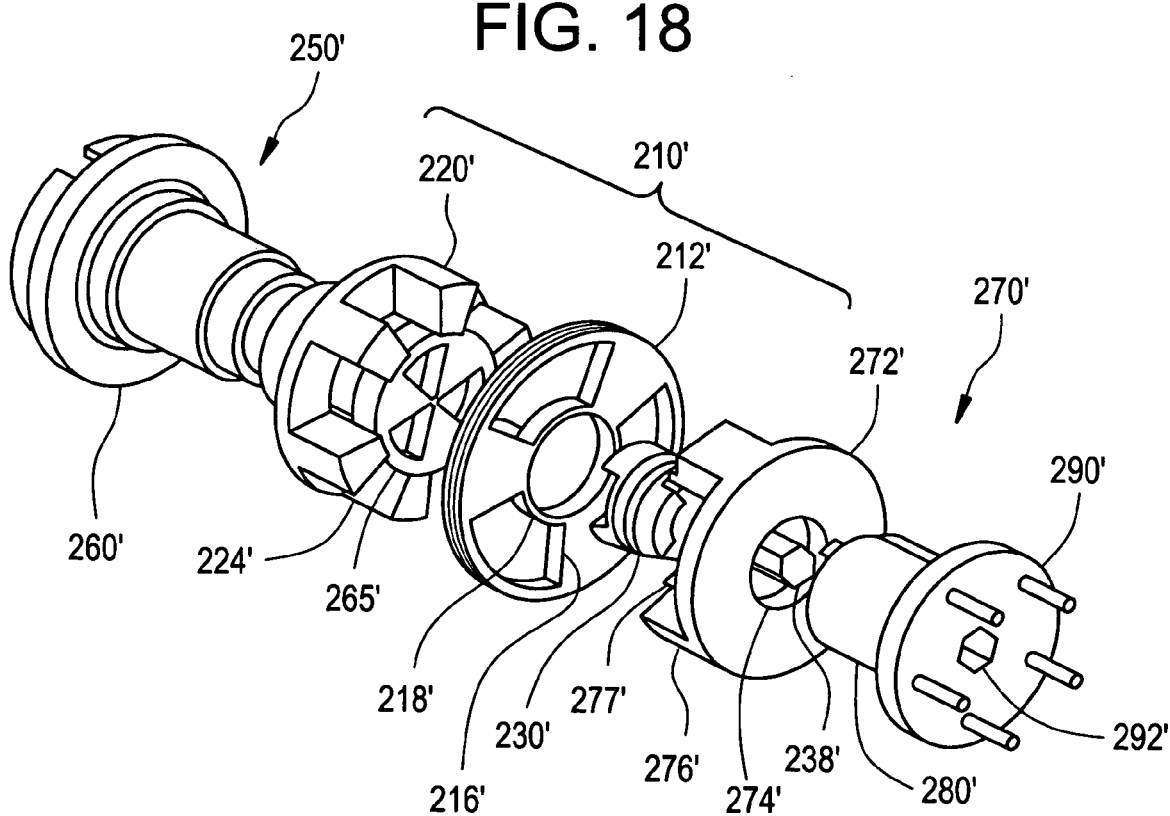
Figure 19:
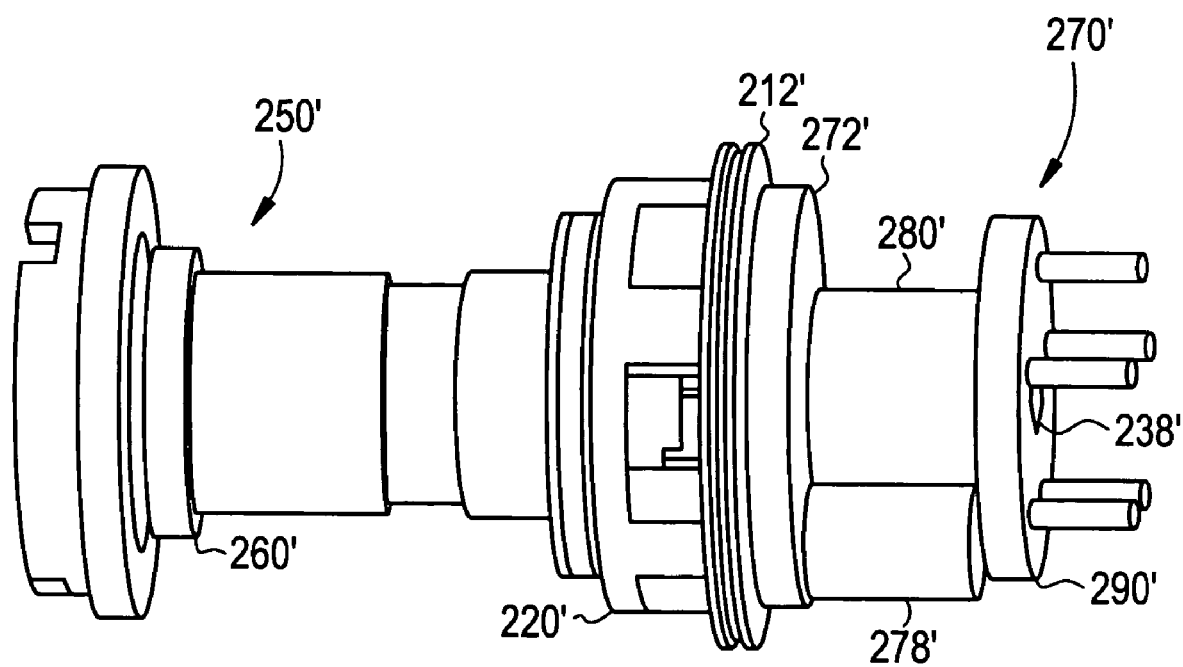

FIGS. 17-19 depict an example modification of the PTO mechanism shown in FIGS. 14-16. Here, the PTO mechanism 210' may provide a dead spindle feature when operated in the CHUCK MODE.

With reference to FIGS. 17 and 18, the PTO mechanism 210' may include an output coupling 220', a PTO actuator shaft 240', a shift spider 212' and a shift coupling 230'.

The output coupling 220' may include a central aperture 222' having a shape that corresponds to the shape of the input shaft 260' of the tool chuck 250' so that the output coupling 220' may be rotationally fixed to the input shaft 260'. The output coupling 220' may include lugs 224'.

The PTO actuator shaft 240' may have a shape that corresponds to the shape of a chuck actuating shaft (not shown). In this way, the PTO actuator shaft 240' may be rotationally fixed to (and axially moveable relative to) the chuck actuating shaft. A rear end of the PTO actuator shaft 240' may be provided with a clutch feature 265'. A spring (not shown), may be captured between the output coupling 220' and the clutch feature 265' to influence the PTO actuator shaft 240' in an axial rearward direction. The axial rearward travel of the PTO actuator shaft 240' (relative to the chuck actuating shaft) may be limited by dogs 277' of the third stage carrier 272'.

The shift spider 212' may have a radial outward facing surface provided with forwardly extended splines (not shown) for selectively engaging with the driver housing (not shown). The radial outward facing surface may also be provided with a continuous circumferential groove 217' for accommodating a wire (not shown). The free ends of the wire may be received in a slot of a shift collar rotatably mounted on the driver housing. Upon rotating the shift collar (via a mode ring, for example), the slot may influence the cam followers (and thus the shift spider 212') to the desired axial positions, as will be discussed in more detail below.

The shift spider 212' may include lug openings 214' through which the lugs 224' of the output coupling 220' extend. The lug openings 214' may be separated from each other via radial extending tabs 216'. The radial inner ends of the tabs 216' may support a drive ring 218'.

The shift coupling 230' may include a radial outward facing surface provided with a continuous circumferential groove 234' for accommodating the drive ring 218' of the shift spider 212'. A retaining ring (not shown) may be provided on the shift coupling 230' to axially capture the drive ring 218'. In this way, the shift coupling 230' may be axially fixed to the shift spider 212'. An axial forward facing surface of the shift coupling 230' may be provided with drive lugs 237' for selectively engaging with the clutch feature 265' provided on the PTO actuator shaft 240'. An axial rearward facing surface of the shift coupling 230' may support lugs 236' for selectively engaging with drive lugs 282' of a third stage sun gear 280'. The shift coupling 230' may support a shaft 238' having a shape that corresponds to the shape of a central aperture 292' of a second stage carrier 290'. In this way, the shift coupling 230' may be rotationally fixed to (and axially moveable relative to) the second stage carrier 290'.

The transmission 270' may include three planetary reduction systems. The third stage carrier 272' may have a central aperture 274' through which the shaft 238' of the shift coupling 230' may extend. The third stage carrier 272' may have an axial forward facing surface that supports drive lugs 276'. The drive lugs 276' may extend through the lug openings 214' of the shift spider 212' and engage with the lugs 224' of the output coupling 220'. In this way, the third stage carrier 272' may be rotationally fixed to the output coupling 220'. The axial forward distal ends of the drive lugs 276' may support dogs 277'. The dogs 277' may selectively engage with the clutch feature 265' of the PTO actuator shaft 240'. As shown, the dogs 277' of the third stage carrier 272' may be located on the radial outside of the drive lugs 237' of the shift coupling 230'.

In this example modification, the third stage sun gear 280' may be mounted for rotation on the second stage carrier 290'. The third stage sun gear 280' may have an axial forward facing surface supporting drive lugs 282'. The drive lugs 282' may extend into the central aperture 274' of the third stage carrier 272' and selectively engage with the lugs 236' of the shift coupling 230'.

In this example embodiment, the tool chuck 250' may be similar to those described with respect to the previous embodiments. Here, however, the rear end of the chuck actuating shaft (not shown) may receive the axial forward end of the PTO actuator shaft 240'.

The example modification may operate differently depending on the axial position of the shift spider 212', which may assume two different operating positions inclusive of a DRILL/DRIVE MODE and a CHUCK MODE.

FIG. 19 shows the shift spider 212' located at an axial rearward position to achieve the DRILL/DRIVE MODE. Here, the shift coupling 230' (axially fixed to the shift spider 212') may assume an axial rearward position in which the lugs 236' may engage with the drive lugs 282' of the third stage sun gear 280'. In this condition, the drive lugs 237' of the shift coupling 230' may be located in the axial direction further rearward than the dogs 277' of the third stage carrier 272'. Thus, the clutch feature 265' (under the influence of the spring) may engage with the dogs 277' of the third stage carrier 272', and not the drive lugs 237' of the shift coupling 230'.

A user may then power up the driver to rotationally drive the tool chuck 250'. At this time, the second stage carrier 290' may rotationally drive the shift coupling 230' (via the shaft 238'), which in turn may rotationally drive the third stage sun gear 280' (via the interacting lugs 236' and 282'). In this way, the second stage carrier 290', the shift coupling 230' and the third stage sun gear 280' may rotate together as a unit. The third stage sun gear 280' may rotationally drive the third stage carrier 272' (via the third stage planetary gears 278'), which in turn may rotationally drive the output coupling 220' (and therefore the input shaft 260', the chuck jaws and the chuck actuating screw). Since the clutch feature 265' (and therefore the PTO actuator shaft 240' and the chuck actuating shaft) and the third stage carrier 272' (and therefore the input shaft 260' and the chuck actuating screw) may be rotationally fixed together, the tool chuck 250' may not loosen during operation.

The shift spider 212' may be located at an axial forward position to achieve the CHUCK MODE. Here, the forwardly extended splines (not shown) of the shift spider 212' may engage with corresponding features provided on the driver housing. Thus, the shift spider 212', the third stage carrier 272' and the output coupling 220' (and therefore the input shaft 260', the chuck jaws and the chuck actuating screw) may remain rotationally grounded to the driver housing.

The drive ring 218' (of the shift spider 212) may drive the shift coupling 230' to an axial forward position. As the shift coupling 230 advances forward, the drive lugs 237' may engage with the clutch feature 265' and push the clutch feature 265' (together with the PTO actuator shaft 240') in an axial forward direction against the influence of the spring (not shown). In this condition, the clutch feature 265' may disengage from the dogs 277' of the third stage carrier 272'. At the same time, the lugs 236' of the shift coupling 230' may disengage from the lugs 282' of the third stage sun gear 280', while the shaft 238' of the shift coupling 230' may remain inserted into the central aperture 292' of the second stage carrier 290'.

A user may then power up the driver to actuate the tool chuck 250'. At this time, the second stage carrier 290' may rotationally drive the shift coupling 230' (via the shaft 238'), which in turn may rotationally drive the PTO actuator shaft 240' (via the interacting drive lugs 237' and the clutch feature 265'). The second stage carrier 290' may not, however, rotationally drive the third stage sun gear 280' since the lugs 236' (of the shift coupling 230') may be disengaged from the lugs 282' (of the third stage sun gear 280'). In this way, the second stage carrier 290' (and therefore the shift coupling 230', the PTO actuator shaft 240' and the chuck actuating shaft) may rotate relative to the third stage sun gear 280' (and therefore the third stage carrier 272', the output coupling 220', the input shaft 260' and the chuck actuating screw), which may remain rotationally grounded to the driver housing (via the shift spider 212'). The rotational movements of the chuck actuating shaft relative to the input shaft 260' may cause the chuck actuating screw to advance or retract in the axial direction (depending on the rotation direction of the chuck actuating shaft 264') to open or close the chuck jaws.

This example modification may also provide a dead spindle feature. For example, during chuck actuation, the input shaft 260', the chuck jaws and the chuck actuating screw may remain rotationally grounded to the driver housing, while the chuck actuating screw may move axially (via the rotational movements of the PTO actuator shaft 240' and the chuck actuating shaft) relative to the input shaft 260' to open and close the chuck jaws.

IV. Example Embodiment Depicted in FIGS. 20 and 21

Figure 20:
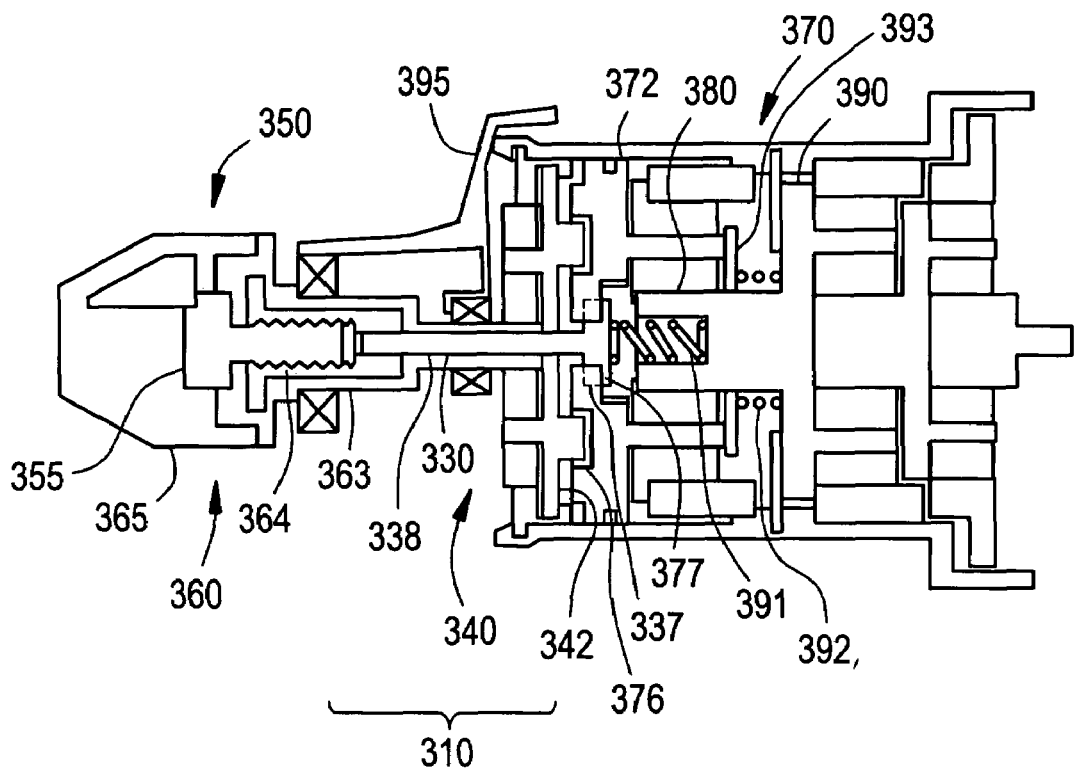
FIGS. 20 and 21 are schematic views of a tool chuck with a power take off mechanism according to another example, non-limiting embodiment of the invention.
Figure 21:
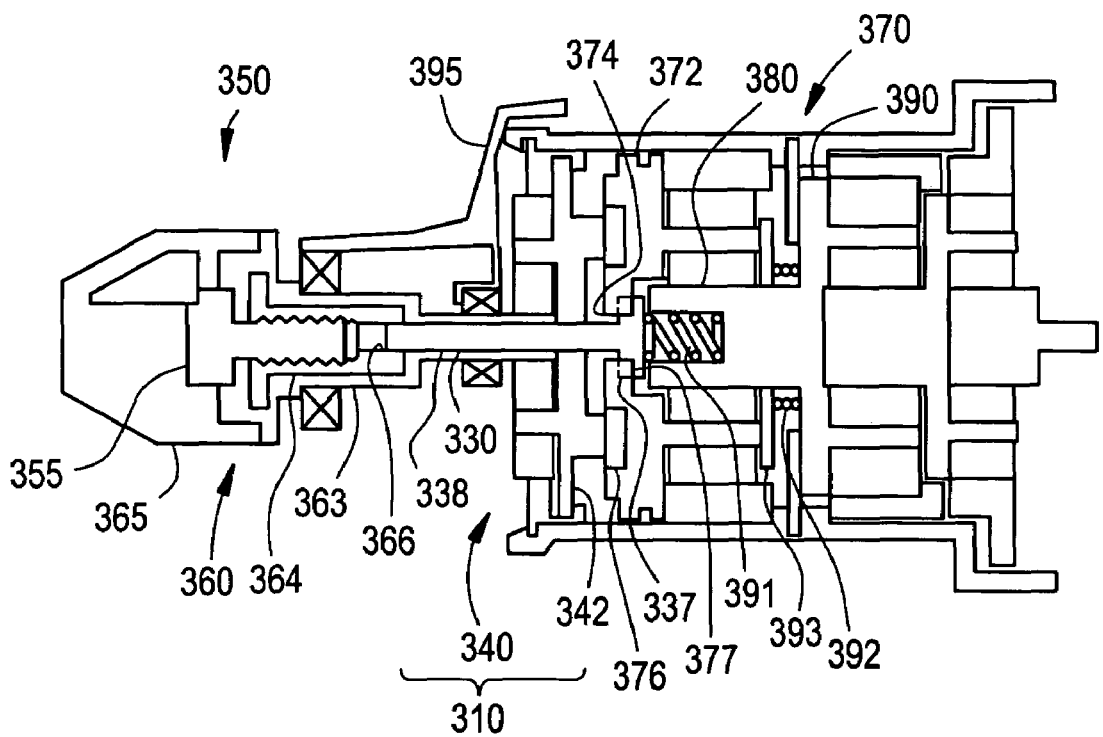

FIGS. 20 and 21 show another example, non-limiting embodiment of a PTO mechanism 310 that may support a tool chuck 350. As in the previous embodiments, the PTO mechanism 310 may be provided at the output end of the transmission 370. This example embodiment, however, may implement a spindle lock.

A. The Structure:

With reference to FIGS. 20 and 21, the PTO mechanism 310 may include a shift coupling 330 and a spindle lock 340.

The shift coupling 330 may have an axial shaft 338. The shaft 338 may be inserted into a through bore 366 of the chuck actuating shaft 364. The shaft 338 may have a shape corresponding to the shape of the through bore 366 so that the shift coupling 330 may be rotationally fixed to (an axially moveable relative to) the chuck actuating shaft 364. From the chuck actuating shaft 364, the shaft 338 of the shift coupling 330 may extend in an axial rearward direction through the main body portion 363 of the input shaft 360 and through the spindle lock 340. The shaft 338 may have an axial rear end that may support a clutch feature 337. The clutch feature 337 may operatively engage with a clutch feature 377 provided on the third stage carrier 372.

The spindle lock 340 may be mounted between the main body portion 363 of the input shaft 360 and the driver housing 395. It will be appreciated that spindle locks are conventionally known in this art. For example, a representative automatic spindle lock is described in U.S. Pat. No. 6,311,787, the entire contents of which is incorporated herein by reference. The spindle lock described in U.S. Pat. No. 6,311,787 could be suitably implemented in the example embodiment with only slight modifications that may be readily apparent to those skilled in the art. In any event, the spindle lock 340 may provide the following functionality.

On the one hand, the spindle lock 340 may allow the input shaft 360 to rotate (relative to the housing 395) when the third stage carrier 372 is in an axial forward position (as shown in FIG. 20). Here, drive lugs 376 on the front surface of the third stage carrier 372 may interact with a cage 342 of the spindle lock 340. When the driver is powered up, the third stage carrier 372 (via the drive lugs 376) may rotationally drive the cage 342, which in turn may rotationally drive the input shaft 360 relative to the housing 395.

On the other hand, the spindle lock 340 may prevent the input shaft 360 from rotating (relative to the housing 395) when the third stage carrier 372 is in the axial rearward position (as shown in FIG. 21). Here, the drive lugs 376 may disengage the spindle lock 340. Thus, when the driver is powered up, the third stage carrier 372 may not rotationally drive the cage 342 so that the input shaft 360 may be rotationally locked to the housing 395.

The transmission 370 may include three planetary reduction systems. The third stage carrier 372 may include a central aperture 374 through which the shaft 338 of the shift coupling 330 may extend. The third stage carrier 372 may have an axial rearward facing surface that supports a clutch feature 377. As noted above, the clutch feature 377 may operatively engage with the clutch feature 337 of the shift coupling 330.

In this example embodiment, the second stage carrier 390 and the third stage sun gear 380 may be fixed together (e.g., the two component parts may of a unitary, one-piece construction). The third stage sun gear 380 may support a spring 391. The spring 391 may influence the shift coupling 330 in an axial forward direction, thereby loading the operative engagement between the clutch feature 337 (of the shift coupling 330) and the clutch feature 377 (of the third stage carrier 372). The second stage carrier 390 may support a spring 392. The spring 392 may (in conjunction with a plate 393) influence the third stage planetary gears in an axial forward direction to ensure that the third stage planetary gears may remain in the desired position on the third stage carrier 372.

In this example embodiment, the tool chuck 350 may be similar to those described with respect to the previous embodiments. Here, however, the rear end of the chuck actuating shaft 364 receives the shaft 338 of the shift coupling 330 so that the shift coupling 330 is rotationally fixed to (and axially moveable relative to) the chuck actuating shaft 364.

B. The Operation:

The tool chuck 350 may operate differently depending on the axial position of the third stage carrier 372, which may assume two different operating positions inclusive of a DRILL/DRIVE MODE and a CHUCK MODE. The third stage carrier 372 may be moved to the desired axial position via (for example) a wire cooperating with a shift collar, as will be readily apparent to those skilled in the art.

FIG. 20 illustrates the third stage carrier 372 at an axial forward position to achieve the DRILL/DRIVE MODE. Here, the drive lugs 376 may engage with the cage 342 of the spindle lock 340. Also, the shift coupling 330 (under the influence of the spring 391) may be located at an axial forward position so that the clutch feature 337 (of the shift coupling 330) may be engaged with the clutch feature 377 (of the third stage carrier 372).

A user may then power up the driver. At this time, the third stage carrier 272 may rotationally drive the spindle lock 340 (via the interacting drive lugs 376 and the cage 342) and the shift coupling 330 (via the interacting clutch features 377 and 337). The spindle lock 340 may rotationally drive the input shaft 360, which may rotate together with the chuck jaws, and the chuck actuating screw 355. At the same time, the shift coupling 330 may rotationally drive the chuck actuating shaft 364. In this way, the components of the tool chuck 350 may rotate together as a unit and relative to the driver housing 395.

FIG. 21 illustrates the third stage carrier 372 at an axial rearward position to achieve the CHUCK MODE. Here, the drive lugs 376 may be disengaged from the cage 342 of the spindle lock 340. The third stage carrier 372 (when moved to the axial rearward position), drives the shift coupling 330 (against the influence of the spring 291) to an axial rearward position.

A user may then power up the driver to actuate the tool chuck 350. At this time, the third stage carrier 372 may rotationally drive the shift coupling 330 (via the interacting clutch features 377 and 337), which in turn may rotationally drive the chuck actuating shaft 364. The input shaft 360 (and therefore the chuck jaws and the chuck actuating screw 355) may be rotationally grounded to the driver housing 395 via the spindle lock 340. The rotational movements of the chuck actuating shaft 364 relative to the chuck actuating screw 355 may cause the chuck actuating screw 355 to advance or retract in the axial direction (depending on the rotation direction of the chuck actuating shaft 364 to open or close the chuck jaws.

This example embodiment may also provide a dead spindle feature during chuck actuation.

Once the tool chuck 350 is tight (i.e., when the chuck jaws clamp the accessory) or fully opened, the cooperating clutch features 377 and 337 (respectively provided on the third stage carrier 372 and the shift coupling 330) may give way and slip relative to each other. At this time, the shift coupling 330 may move in an axial rearward direction against the influence of the spring 391. When the cooperating clutch features 377 and 337 slip, they may produce an audible indication that the chuck actuation process is complete. Further, the cooperating clutch features 377 and 337 may give way or slip at a predetermined torque threshold, which may be less during a tightening operation than during a loosening operation.

C. First Example Modification—FIGS. 22 and 23

Figure 22:
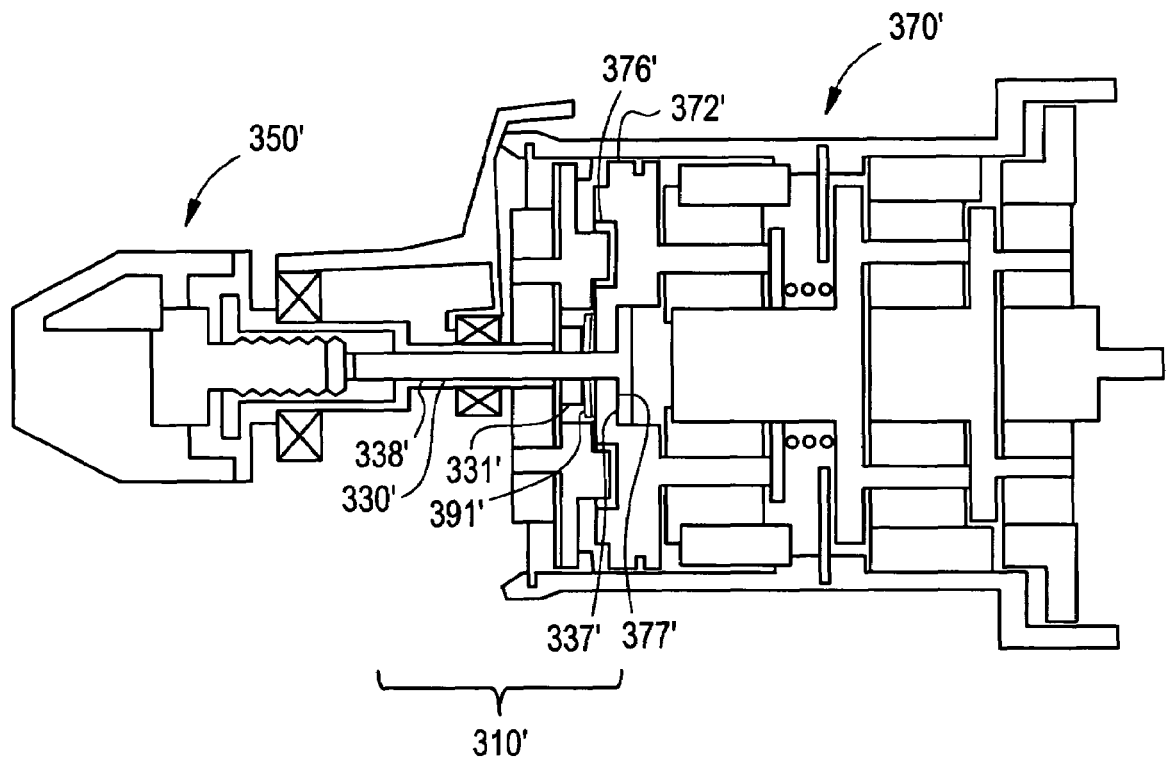
FIGS. 22 and 23 are schematic views of a first example modification of the power take off mechanism illustrated in FIGS. 20 and 21.
Figure 23:
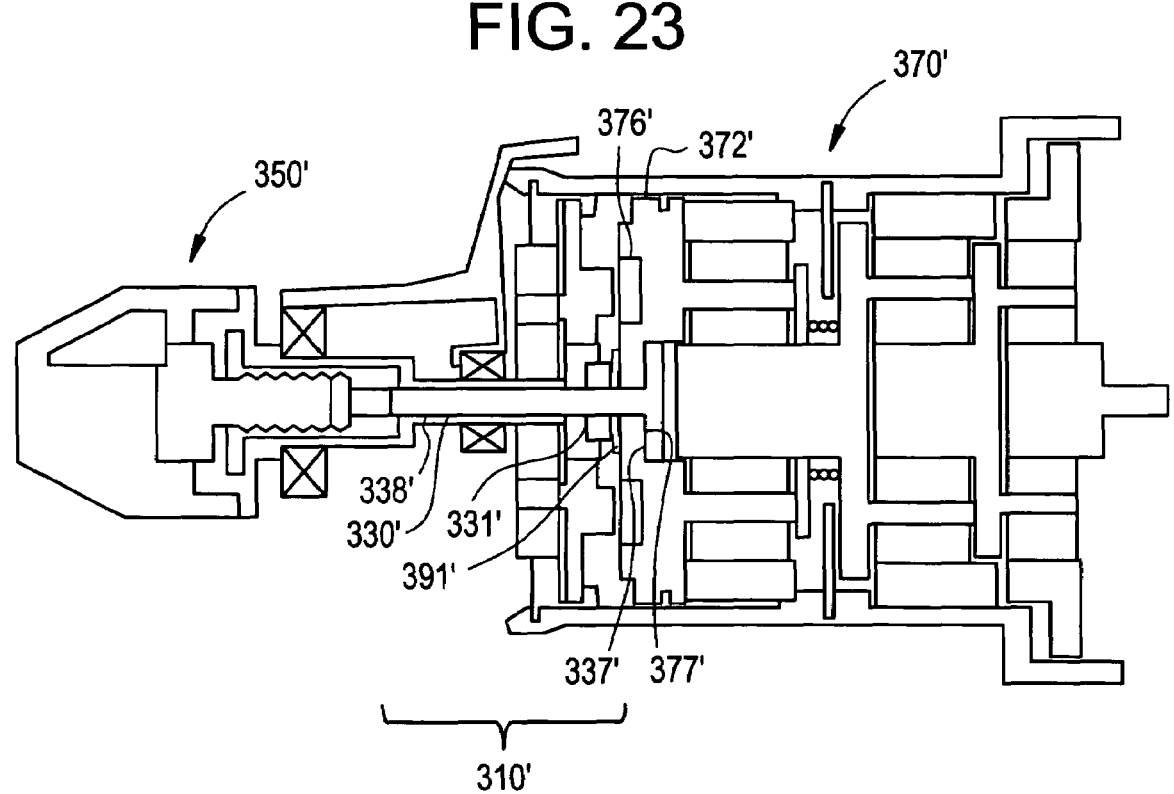

FIGS. 22 and 23 depict a first example modification of the PTO mechanism shown in FIGS. 20 and 21. Here, the coil spring 391 (provided between the shift coupling 330 and the third stage sun gear 380) may be dispensed with in favor of a hub 331' and a spring 391'. The hub 331' may be press fit and fixed to the shaft 338' of the shift coupling 330'. The spring 391' (e.g., a belville spring) may be captured between the hub 331' and the third stage carrier 372'. The spring 391' may load the operative engagement between the clutch features 337' and 377' respectively provided on the shift coupling 330' and the third stage carrier 372'. Numerous and alternative clutch features 337' and 377' may be suitably implemented. For example, the clutch features may be in the form of corresponding proffied surfaces and/or friction surfaces, which will be readily appreciated by those skilled in the art.

In this example modification, the spring 391' may not provide an axial load on the transmission 370'. Further, this example modification may provide for a preset clutch/third stage carrier/spring subassembly that may reduce (or possibly altogether prevent) transmission stack up effects on clutch loading. Otherwise, this example modification is structurally and functionally similar to the example embodiment depicted in FIGS. 20 and 21.

FIG. 22 illustrates the third stage carrier 372' at an axial forward position to achieve the DRILL/DRIVE MODE. And FIG. 23 illustrates the third stage carrier 372' at an axial rearward position to achieve the CHUCK MODE.

D. Second Example Modification—FIGS. 24 and 25

FIGS. 24 and 25 depict a second example modification of the PTO mechanism shown in FIGS. 20 and 21, in which the clutch feature of the shift coupling may be dispensed with. Here, the shift coupling 330" may include a shaft 338" having an axial rear end that may be fixed to the third stage carrier 372". The shaft 338" may be in the form of a flexible torsion rod.

FIG. 24, illustrates the third stage carrier 372" at an axial rearward position to achieve the CHUCK MODE. When the driver is powered up, the power path may run from the third stage carrier 372" and into the shaft 338" of the PTO mechanism 310" to actuate the tool chuck 350". When tool chuck 350" becomes tight, a transmission clutch may give way. Transmission clutches are well known in this art, and therefore a detailed discussion of the same is omitted.

FIG. 25 illustrates the third stage carrier 372' at an axial forward position to achieve the DRILL/DRIVE MODE. When shifting to the DRILL/DRIVE MODE, the shaft 338" (by virtue of being a flexible torsion rod) may remain loaded with torque as the third stage carrier 372" engages the cage 342" of the spindle lock 340". In this way, a prevailing load may be applied to the tool chuck 250" to keep it tight. Otherwise, this example modification is structurally and functionally similar to the example embodiment depicted in FIGS. 20 and 21.

E. Third Example Modification—FIGS. 26 and 27

Figure 26:
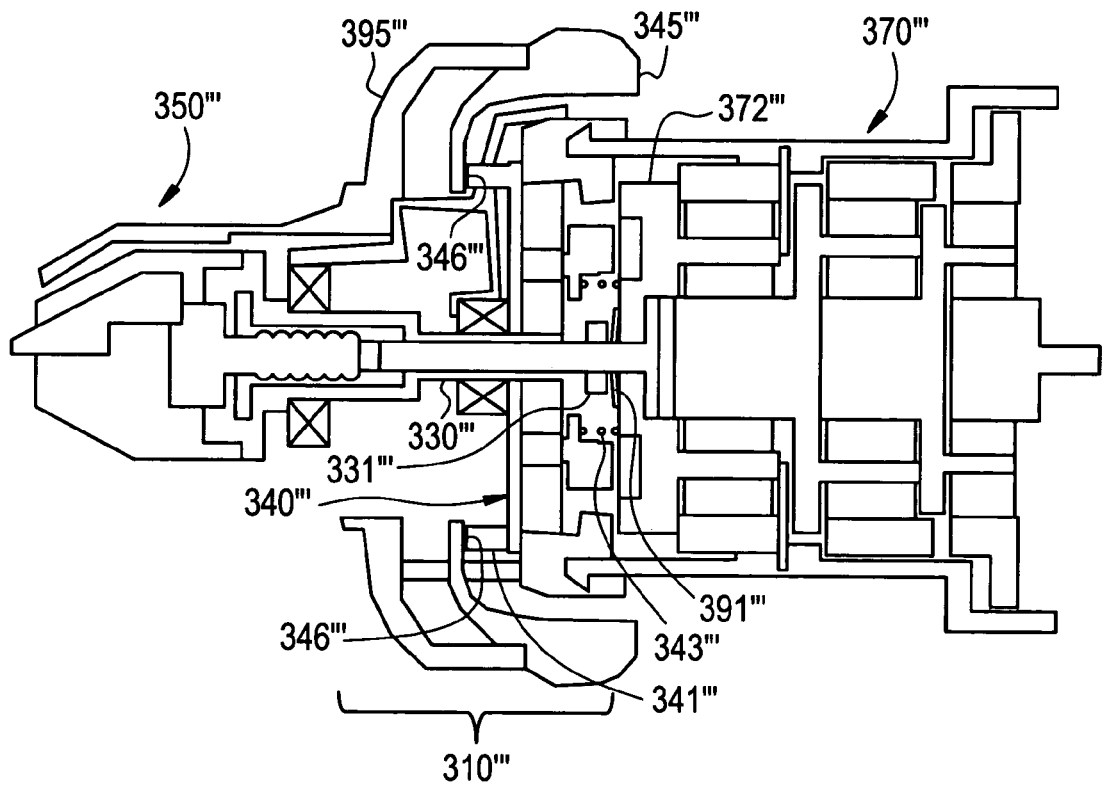
FIGS. 26 and 27 are schematic views of a third example modification of the power take off mechanism illustrated in FIGS. 20 and 21.
Figure 27:
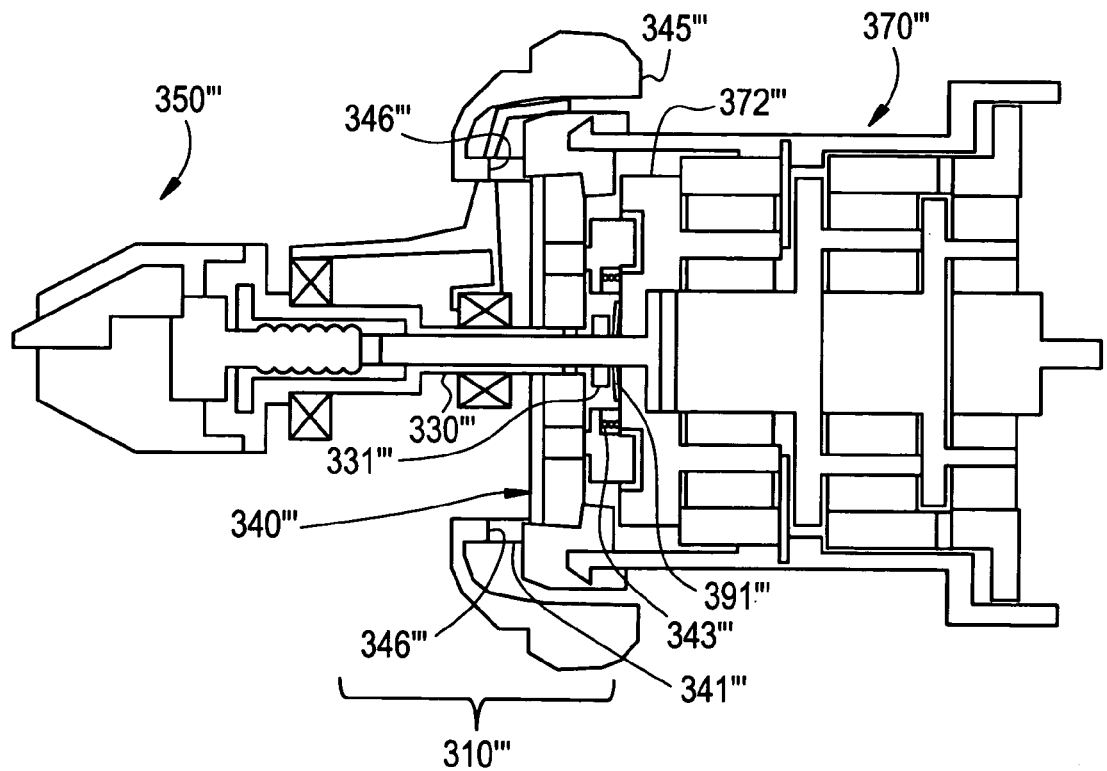

FIGS. 26 and 27 depict a third example modification of the PTO mechanism shown in FIGS. 20 and 21. Here, the spindle lock 340''' may be moveable to an axial forward position (as shown in FIG. 26) to achieve the CHUCK MODE and an axial rearward position (as shown in FIG. 27) to achieve a DRILL/DRIVE MODE. In this example modification, the CHUCK MODE and the DRILL/DRIVE MODE may be achieved while maintaining the third stage carrier 372''' and the shift coupling 330''' at fixed axial positions.

A mode ring 345''' may be mounted for rotation on the driver housing 395'''. The mode ring 345''' may have cam surfaces 346''' that interact with pins 341''' extended axial forward from the spindle lock 340'''. The spindle lock 340''' may be influenced by a spring 343''' (captured between the spindle lock 340''' and the third stage carrier 372''') in an axial forward direction. A user may turn the mode ring 345''' (relative to the driver housing 395''') so that the cam surfaces 346''' may interact with the pins 341''' to move the spindle lock 340''' to the desired axial position.

This example modification may employ a hub 331''' and a spring 391''', similar to that described above in section IV C, to load the operative engagement between the clutch features respectively provided on the shift coupling 330''' and the third stage carrier 372'''.

FIG. 26, illustrates the spindle lock 340''' at an axial forward position to achieve the CHUCK MODE. And FIG. 25 illustrates the spindle lock 340''' at an axial rearward position to achieve the DRILL/DRIVE MODE. Otherwise, this example modification is structurally and functionally similar to the example embodiment depicted in FIGS. 20 and 21.

V. Example Embodiment Depicted in FIG. 28

Figure 28:
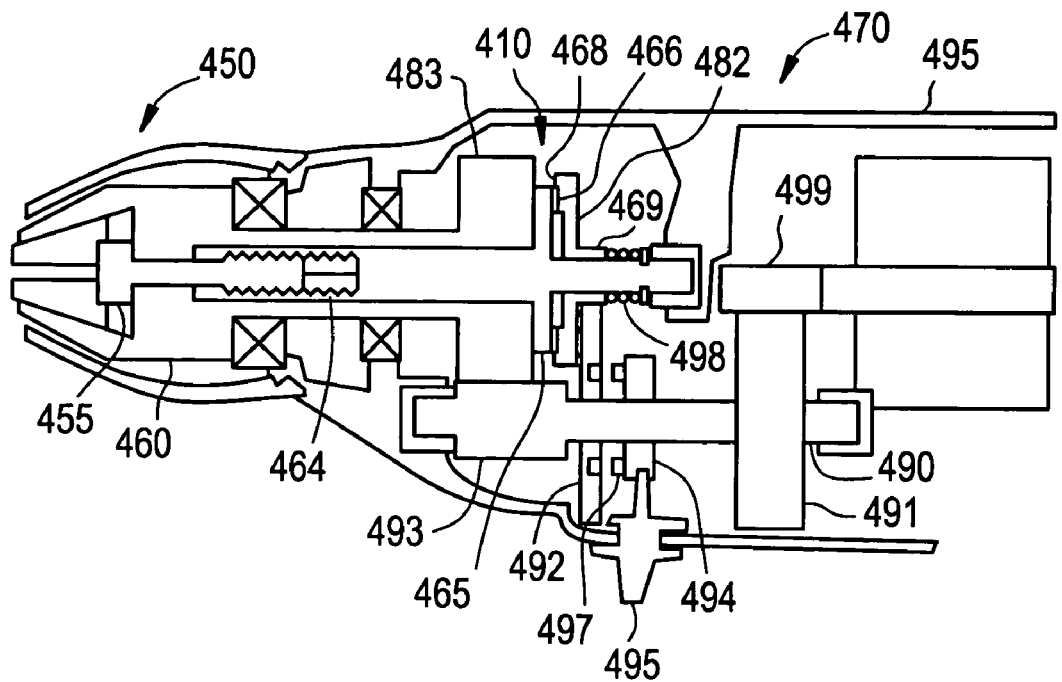
FIG. 28 is a schematic view of a tool chuck with a power take off mechanism according to another example, non-limiting embodiment of the invention.

FIG. 28 shows another example, non-limiting embodiment of a PTO mechanism 410. Here, the PTO mechanism 410 may be connected to a conventional parallel axis transmission 470.

A. The Structure:

With reference to FIG. 28, the PTO mechanism 410 may include a chuck actuating hammer 482 that may be mounted for rotation on the chuck actuating shaft 464 of the tool chuck 450. The chuck actuating hammer 482 may also be axially moveable along the chuck actuating shaft 464. The chuck actuating hammer 482 may include hammer lugs 468, which may cooperate with corresponding hammer lugs 466 provided on a hammer anvil 465 of the chuck actuating shaft 464 of the tool chuck 450. A spring 498 (captured between the chuck actuating hammer 482 and a keeper mounted on the chuck actuating shaft 464) may influence the chuck actuating hammer 482 in an axial forward direction. The chuck actuating hammer 482 may have a radial outward facing surface provided with gear teeth that may engage with a chuck actuating drive gear 492.

The conventional parallel axis transmission 470 may couple an electric motor to a tool chuck 450. The electric motor may have a rotary shaft that supports an output gear 499. The output gear 499 may engage with and rotationally drive an intermediate shaft 490.

The intermediate shaft 490 may be mounted for rotation in the housing 495 of the driver. The intermediate shaft 490 may support an input gear 491, the chuck actuating drive gear 492, and an input shaft drive gear 493. The input gear 491 (rotationally fixed to the intermediate shaft 490) may engage with the output gear 499, the chuck actuating drive gear 492 (rotatable relative to the intermediate shaft 490) may engage with the chuck actuating hammer 482 of the PTO mechanism 410, and the input shaft drive gear 493 (rotationally fixed to the intermediate shaft 490) may engage with an input shaft driven gear 483 fixed to the input shaft 460 of the tool chuck 450.

The intermediate shaft 490 may also support a shift plate 494. The shift plate 494 may be rotationally fixed to (and axially moveable relative to) the intermediate shaft 490. The shift plate 494 may include drive lugs 497 for selectively engaging with corresponding features provided on the chuck actuating drive gear 492. A selector 445 may be mounted on the driver housing 495 for axial movement. The selector 445 may be coupled to the shift plate 494. A user may manipulate the selector 445 to drive the shift plate 494 to the desired axial position.

Power may be taken off the transmission 470 via the input shaft drive gear 493 in both a DRILL/DRIVE MODE and a CHUCK MODE. Power may also be taken off the transmission 470 via the chuck actuating drive gear 492 in the CHUCK MODE.

In this example embodiment, the tool chuck may be similar to those described with respect to the previous embodiments. Here, however, the input shaft 460 may be fixed to the input shaft driven gear 483, and the chuck actuating shaft 464 may be fixed to the hammer anvil 465.

B. The Operation:

The tool chuck 450 may operate differently depending on the axial position of the shift plate 494, which may assume two different operating positions inclusive of the DRILL/DRIVE MODE and a CHUCK MODE.

FIG. 28 depicts the shift plate 494 at an axial rearward position to achieve the DRILL/DRIVE MODE. Here, the shift plate 494 may be disengaged from the chuck actuating drive gear 492.

When the driver is powered up, the input shaft drive gear 493 may rotationally drive the input shaft driven gear 483 together with the input shaft 460. The input shaft 460 may rotate together with the chuck jaws, the chuck actuating screw 455, the chuck actuating shaft 464 and the chuck actuating hammer 482. In this condition, the chuck actuating drive gear 492 may rotate relative to the intermediate shaft 490. In the DRILL/DRIVE mode, the power from the transmission 470 is delivered to the input shaft driven gear 483 to rotationally drive the tool chuck 450.

The shift plate 494 may be located at an axial forward position to achieve the CHUCK MODE. Here, the shift plate 494 (via the drive lugs 497) may be rotationally fixed to the chuck actuating drive gear 492.

When the driver is powered up, the input shaft drive gear 493 may rotationally drive the input shaft driven gear 483 together with the input shaft 460. The input shaft 460 may rotate together with the chuck jaws and the chuck actuating screw 455. At the same time, the chuck actuating drive gear 492 may rotationally drive the chuck actuating hammer 482, which in turn may rotationally drive the chuck actuating shaft 464 (via the interacting hammer lugs 466 and 468).

The chuck actuating drive gear 492 may be larger than the input shaft drive gear 493, and thus the chuck actuating hammer 482 may be driven at a faster rotational speed than the input shaft driven gear 483. As a result, relative to the housing 495, the chuck actuating shaft 464 may rotate faster than the chuck actuating screw 455. This speed differential may result in a relative rotation between the chuck actuating shaft 464 and the chuck actuating screw 455, thereby causing the chuck actuating screw 455 to advance or retract in the axial direction to open or close the chuck jaws.

Once the tool chuck 450 is tight (e.g., when the chuck jaws clamp the accessory) or fully opened, the hammer lugs 468 on the chuck actuating hammer 482 may give way and slip relative to the hammer lugs 466 on the hammer anvil 465. At this time, the chuck actuating hammer 482 may move in an axial rearward direction against the influence of the spring 498. A gap between the chuck actuating hammer 482 and the chuck actuating drive gear 492 may accommodate the rearward axial movement of the chuck actuating hammer 482. As the chuck actuating hammer 482 and the hammer anvil 465 slip, the hammer lugs 466 and 468 may impact with each other to further tighten or loosen the tool chuck 450.

C. Example Modification—FIG. 29

Figure 29:
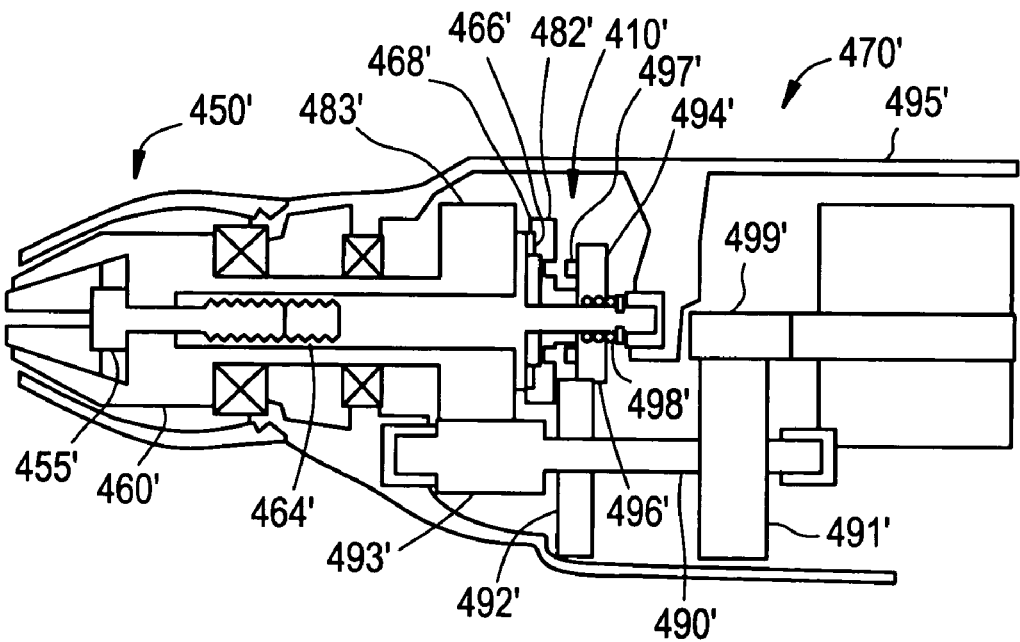
FIG. 29 is a schematic view of an example modification of the power take off mechanism illustrated in FIG. 28.

FIG. 29 depicts an example modification of the PTO mechanism shown in FIG. 28. Here, the shift plate 494' may be mounted on the chuck actuating shaft 464' (instead of the intermediate shaft of the transmission).

The shift plate 494' may be mounted for rotation on the chuck actuating shaft 464'. The shift plate 494' may be axially moveable relative to the chuck actuating shaft 464'. The shift plate 494' may be driven to the desired axial position by a variety of mechanisms (e.g., a selector, not shown). The shift plate 494' may include a radial outward facing surface provided with gear teeth 496' that may engage with the chuck actuating drive gear 492'. The shift plate 494' may include drive lugs 497' for selectively engaging with corresponding features provided on the chuck actuating hammer 482'.

The transmission 470' is similar to the one described above. Here, however, the chuck actuating drive gear 492' may be fixed to the intermediate shaft 490'.

The tool chuck 450' may operate differently depending on the axial position of the shift plate 494', which may assume two different operating positions inclusive of the DRILL/DRIVE MODE and a CHUCK MODE.

FIG. 29 depicts the shift plate 494' at an axial rearward position to achieve the DRILL/DRIVE MODE. Here, the shift plate 494' may be disengaged from the chuck actuating hammer 482'. When the driver is powered up, the input shaft drive gear 493' may rotationally drive the input shaft driven gear 483' together with the input shaft 460'. The input shaft 460' may rotate together with the chuck jaws, the chuck actuating screw 455', the chuck actuating shaft 464' and the chuck actuating hammer 482'. In this condition, the shift plate 494', rotationally driven by the chuck actuating drive gear 492', may free wheel about the chuck actuating shaft 464'. In the DRILL/DRIVE mode, the power from the transmission 470' is delivered to the input shaft driven gear 483' to rotationally drive the tool chuck 450'.

The shift plate 494' may be located at an axial forward position to achieve the CHUCK MODE. Here, the shift plate 494' (via the drive lugs 497') may be rotationally fixed to the chuck actuating hammer 482'. When the driver is powered up, the input shaft drive gear 493' may rotationally drive the input shaft driven gear 483' together with the input shaft 460'. The input shaft 460' may rotate together with the chuck jaws and the chuck actuating screw 455'. At the same time, the chuck actuating drive gear 492' may rotationally drive the shift plate 494'. The shift plate 494' may (via the drive lugs 497') rotationally drive the chuck actuating hammer 482'. The chuck actuating hammer 482' may rotationally drive the chuck actuating shaft 464' (via the interacting hammer lugs 466' and 468').

Relative to the housing 495', the chuck actuating shaft 464' may rotate faster than the chuck actuating screw 455'. This speed differential may result in a relative rotation between the chuck actuating shaft 464' and the chuck actuating screw 455', thereby causing the chuck actuating screw 455' to advance or retract in the axial direction to open or close the chuck jaws.

Once the tool chuck 450' is tight (e.g., when the chuck jaws clamp the accessory) or fully opened, the hammer lugs 468' on the chuck actuating hammer 482' may give way and slip relative to the hammer lugs 466' on the hammer anvil 465'. At this time, the chuck actuating hammer 482' (together with the shift plate 494') may move in an axial rearward direction against the influence of the spring 498'. As the chuck actuating hammer 482' and the hammer anvil 465' slip, the hammer lugs 466' and 468' may impact with each other to further tighten or loosen the tool chuck 450'.

What is claimed is:

1. A power driver comprising:
    a housing;
    a tool chuck having
        an input shaft mounted on the housing so that the input shaft is rotatable relative to the housing, the input shaft supporting chuck jaws, and
        a chuck actuating shaft mounted for rotation on the input shaft; and
    a power take off mechanism connected to the tool chuck, the power take off mechanism being adjustable into
        a DRILL DRIVE MODE to rotationally drive the input shaft and the chuck actuating shaft together as a unit, and
        a CHUCK MODE to rotationally drive the chuck actuating shaft relative to the input shaft;
    wherein the power take off mechanism is internal of the housing.

2. The power driver as set forth in claim 1, wherein the power take off mechanism is internal of the housing and the tool chuck.

3. The power driver as set forth in claim 1, wherein the power take off mechanism in the CHUCK MODE rotationally fixes the input shaft to the housing.

4. The power driver as set forth in claim 1, wherein the power take off mechanism in the CHUCK MODE rotationally drives the chuck actuating shaft at a first rotational speed and rotationally drives the input shaft at a second rotational speed.

5. The power driver as set forth in claim 1, wherein the power take off mechanism is adjustable into a MANUAL OVERRIDE MODE to rotationally fix the chuck actuating shaft to the housing.

6. The power driver as set forth in claim 1, wherein the chuck jaws are threadless chuck jaws.

7. The power driver as set forth in claim 1, wherein, when the power driver is driven in a forward direction with the power take off mechanism in the DRILL DRIVE MODE,
   the power take off mechanism rotationally drives the input shaft and the chuck actuating shaft together as a unit until an application torque increases up to a torque threshold, and
   upon the application torque exceeding the torque threshold, the power take off mechanism rotationally drives the chuck actuating shaft relative to the input shaft.

8. The power driver as set forth in claim 7, wherein, when the power driver is driven in a reverse direction with the power take off mechanism in the DRILL DRIVE MODE, the power take off mechanism rotationally drives the input shaft and the chuck actuating shaft together as a unit regardless of the application torque.

9. The power driver as set forth in claim 7, wherein the power take off mechanism comprises:
   an output coupling rotationally fixed to the input shaft; and
   at least one spring loaded pawl mounted for rotation on the output coupling.

10. A power driver comprising:
    a tool chuck having
       an input shaft mounted on a housing so that the input shaft is rotatable relative to the housing, the input shaft supporting threadless chuck jaws, and
       a chuck actuating shaft mounted for rotation on the input shaft; and power take off means for adjusting into
       a DRILL DRIVE MODE to rotationally drive the input shaft and the chuck actuating shaft together as a unit, and
       a CHUCK MODE to rotationally drive the chuck actuating shaft relative to the input shaft.

11. The power driver as set forth in claim 10, wherein the housing rotatably supports the tool chuck; and
    wherein the power take off means in the CHUCK MODE rotationally fixes the input shaft to the housing.

12. The power driver as set forth in claim 10, wherein the power take off means in the CHUCK MODE rotationally drives the chuck actuating shaft at a first rotational speed and rotationally drives the input shaft at a second rotational speed.

13. The power driver as set forth in claim 10, wherein the housing rotatably supports the tool chuck;
    wherein the power take off means is for adjusting into a MANUAL OVERRIDE MODE to rotationally fix the chuck actuating shaft to the housing.

14. A power driver comprising:
    a tool chuck having
       an input shaft supporting chuck jaws, and
       a chuck actuating shaft mounted for rotation on the input shaft; and
    a power take off mechanism having
       a power take off actuator shaft rotationally fixed to the chuck actuating shaft;
       an output coupling rotationally fixed to the input shaft;
       a power take off drive disk rotationally fixed to the power take off actuator shaft;
       a disk confronting the power take off drive disk; and
       a shift ring mounted for movement to selectively engage with and rotationally lock to the output coupling, the power take off drive disk and the disk.

15. The power driver as set forth in claim 14, wherein the shift ring is moveable to an axial forward position to engage with the output coupling.

16. The power driver as set forth in claim 15, further comprising a housing rotatably supporting the tool chuck;
    wherein the shift ring in the axial forward position is rotationally fixed to the housing.

17. The power driver as set forth in claim 14, wherein the shift ring is moveable to an axial intermediate position to engage with the output coupling, the power take off drive disk and the disk.

18. The power driver as set forth in claim 17, further comprising a housing rotatably supporting the tool chuck;
    wherein the shift ring in the axial intermediate position is rotatable relative to the housing.

19. The power driver as set forth in claim 14, where in the shift ring is moveable to an axial rearward position to engage with the power take off drive disk and the disk.

20. The power driver as set forth in claim 19, further comprising a housing rotatably supporting the tool chuck;
    wherein the shift ring in the axial rearward position is rotationally fixed to the housing.

* * * * *